US011654823B2

(12) United States Patent
Aono et al.

(10) Patent No.: US 11,654,823 B2
(45) Date of Patent: May 23, 2023

(54) LIGHT IRRADIATION CONTROL APPARATUS AND METHOD OF LIGHT IRRADIATION CONTROL

(71) Applicant: MITSUBISHI ELECTRIC CORPORATION, Tokyo (JP)

(72) Inventors: Mitsuhiro Aono, Tokyo (JP); Mitsuo Shimotani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 613 days.

(21) Appl. No.: 16/607,933

(22) PCT Filed: Jun. 9, 2017

(86) PCT No.: PCT/JP2017/021455
§ 371 (c)(1),
(2) Date: Oct. 24, 2019

(87) PCT Pub. No.: WO2018/225241
PCT Pub. Date: Dec. 13, 2018

(65) Prior Publication Data
US 2021/0094464 A1 Apr. 1, 2021

(51) Int. Cl.
*B60Q 1/50* (2006.01)
*H05B 47/105* (2020.01)
*G08G 1/00* (2006.01)

(52) U.S. Cl.
CPC ............... *B60Q 1/50* (2013.01); *G08G 1/22* (2013.01); *H05B 47/105* (2020.01); *B60Q 2400/20* (2013.01)

(58) Field of Classification Search
CPC .... B60Q 1/50; B60Q 2400/20; H05B 47/105; G08G 1/22
See application file for complete search history.

(56) References Cited

U.S. PATENT DOCUMENTS

2010/0256852 A1* 10/2010 Mudalige ............... G08G 1/164
701/24
2018/0056851 A1* 3/2018 Kim ..................... G08G 1/161
2019/0012911 A1* 1/2019 Takii ....................... B60Q 1/00

FOREIGN PATENT DOCUMENTS

JP    2009-157501 A    7/2009
JP    4302355 B2 *    7/2009
(Continued)

OTHER PUBLICATIONS

Japanese Notice of Reasons for Refusal for Japanese Application No. 2019-523309, dated Apr. 13, 2021, with an English translation.
(Continued)

*Primary Examiner* — Behrang Badii
*Assistant Examiner* — Jay Khandpur
(74) *Attorney, Agent, or Firm* — Birch, Stewart, Kolasch & Birch, LLP

(57) ABSTRACT

An object is to provide a light-irradiation technique that are capable of making the driver of a vehicle around a vehicle platoon aware of changes in the vehicle configuration of the vehicle platoon. During no changes in the vehicle configuration of a vehicle platoon, a controller performs control in such a manner that an irradiation device of the vehicle casts light in a steady-state mode common in the vehicle platoon. In a process where the vehicle merges with another of the vehicle alone or another of the vehicle platoon, the controller performs control in such a manner that the irradiation device of the merging vehicle casts light in a transition mode. In a process where the vehicle leaves the vehicle platoon, the controller performs control in such a manner that the irradiation device of the leaving vehicle casts light in the transition mode.

16 Claims, 24 Drawing Sheets

(56) References Cited

FOREIGN PATENT DOCUMENTS

| JP | 2009157501 A | * | 7/2009 |
| JP | 2014-130409 A | | 7/2014 |
| JP | 2014130409 A | * | 7/2014 |

OTHER PUBLICATIONS

Japanese Notice of Reasons for Refusal for Japanese Application No. 2019-523309, dated Sep. 23, 2020, with an English translation.
Notice of Reasons for Refusal issued in corresponding Japanese Application No. 2019-523309 dated Mar. 3, 2020.
International Search Report for PCT/JP2017/021455 dated Aug. 29, 2017.

* cited by examiner

LIGHT IRRADIATION CONTROL APPARATUS AND METHOD OF LIGHT IRRADIATION CONTROL

TECHNICAL FIELD

The present invention relates to light-irradiation control apparatuses and methods of light irradiation control. More specifically, the present invention relates to a light-irradiation control apparatus that controls an irradiation device that is installed in a vehicle and casts light upon a road. The present invention also relates to a method of light irradiation control for performing such control.

BACKGROUND ART

In the field of autonomous driving, an autonomous-travel technique is known that addresses multiple vehicles traveling closely together as a vehicle platoon. It is important in this autonomous-travel technique to make the driver of another vehicle traveling around the vehicle platoon aware which vehicle is platooning. A known technique is that the vehicle platoon casts light to make the driver of another vehicle aware of the vehicle platoon (c.f., Patent Document 1).

PRIOR ART DOCUMENT

Patent Document

Patent Document 1: Japanese Patent Application Laid-Open No. 2014-130409

SUMMARY

Problem to be Solved by the Invention

The technique in Patent Document 1 is good enough for a vehicle platoon that is in steady state where its vehicle configuration remains unchanged. The vehicle configuration of the vehicle platoon is subject to change depending on vehicle mergence, vehicle separation, and other factors. The technique in Patent Document 1 unfortunately fails to effectively make the driver of a vehicle around the platoon aware of such changes in the vehicle configuration.

To solve this problem, it is an object of the present invention to provide a light-irradiation control apparatus and a method of light irradiation control that electively enable the driver of a vehicle around a vehicle platoon to become aware of changes in the vehicle configuration of the vehicle platoon.

Means to Solve the Problem

The present invention provides a light-irradiation control apparatus that controls an irradiation device that is installed in a vehicle and casts light upon a road. The light-irradiation control apparatus includes the following: an irradiation controller that controls an output of an irradiation device that casts light upon a road; a vehicle-platoon-information acquiring unit that acquires information about the state of a vehicle platoon composed of a plurality of vehicles traveling closely together; and controller that controls the irradiation controller of the vehicle in accordance with the information acquired by the vehicle-platoon-information acquiring unit. During no changes in the vehicle configuration of the vehicle platoon to which the vehicle belongs, the controller controls the irradiation controller in such a manner that the irradiation device of the vehicle casts light in a steady-state mode that is common in the vehicle platoon. In a process where the vehicle alone or the vehicle platoon to which the vehicle belongs, merges with another of the vehicle alone or another of the vehicle platoon, the controller controls the irradiation controller in such a manner that the irradiation device of the merging vehicle casts light in a transition mode that is different from the steady-state mode. In a process where the vehicle alone belonging to the vehicle platoon or a plurality of vehicles belonging to the vehicle platoon leaves the vehicle platoon, the controller controls the irradiation controller in such a manner that the irradiation device of the leaving vehicle casts light in the transition a node.

The present invention provides a method of light-irradiation control for controlling an irradiation device hat is installed in a vehicle and casts light upon a road. The method includes the following: acquiring information about the state of a vehicle platoon composed of a plurality of vehicles traveling closely together; controlling the irradiation controller of the vehicle in accordance with the information about the vehicle platoon; during no changes in the vehicle configuration of the vehicle platoon to which the vehicle belongs, performing control in such a manner that the irradiation device of the vehicle casts light in a steady-state mode that is common in the vehicle platoon; in a process where the vehicle alone or the vehicle platoon to which the vehicle belongs, merges with another of the vehicle alone or another of the vehicle platoon, performing control in such a manner that the irradiation device of the merging vehicle casts light in a transition mode that is different from the steady-state mode; and in a process where the vehicle alone belonging to the vehicle platoon or a plurality of vehicles belonging to the vehicle platoon leaves the vehicle platoon, performing control in such a manner that the irradiation device of the leaving vehicle casts light in the transition mode.

Effects of the Invention

The light-irradiation control apparatus and method of light irradiation control according to the present invention controls the irradiation device to cast light upon the road in the transition mode, different from the steady-state mode, in the process where the vehicle alone or the vehicle platoon merges with or leaves the other vehicle alone or the other vehicle platoon. Such a configuration enables the driver of a vehicle traveling around the vehicle platoon, to visually become aware that the vehicle configuration of the vehicle platoon is changing. The driver of the vehicle traveling around the vehicle platoon can consequently expect the movement of the vehicle platoon easily. The vehicle platoon accordingly less bears burdens (e.g., avoidance control) resulting from incautious movements of the vehicle traveling around the vehicle platoon. This reduces travel control processes in the vehicle platoon.

These and other objects, features, aspects and advantages of the present invention will become more apparent from the following detailed description of the present invention when taken in conjunction with the accompanying drawings.

DESCRIPTION OF EMBODIMENTS

First Embodiment

Configuration

Figure 1:
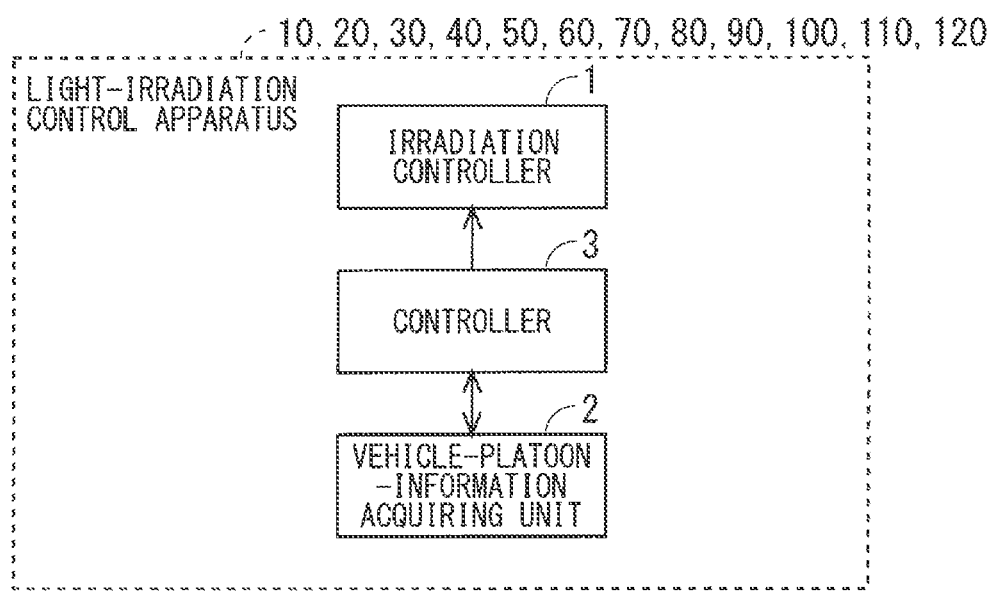
FIG. 1 is a block diagram of a light-irradiation control apparatus according to a first embodiment.
Figure 2:
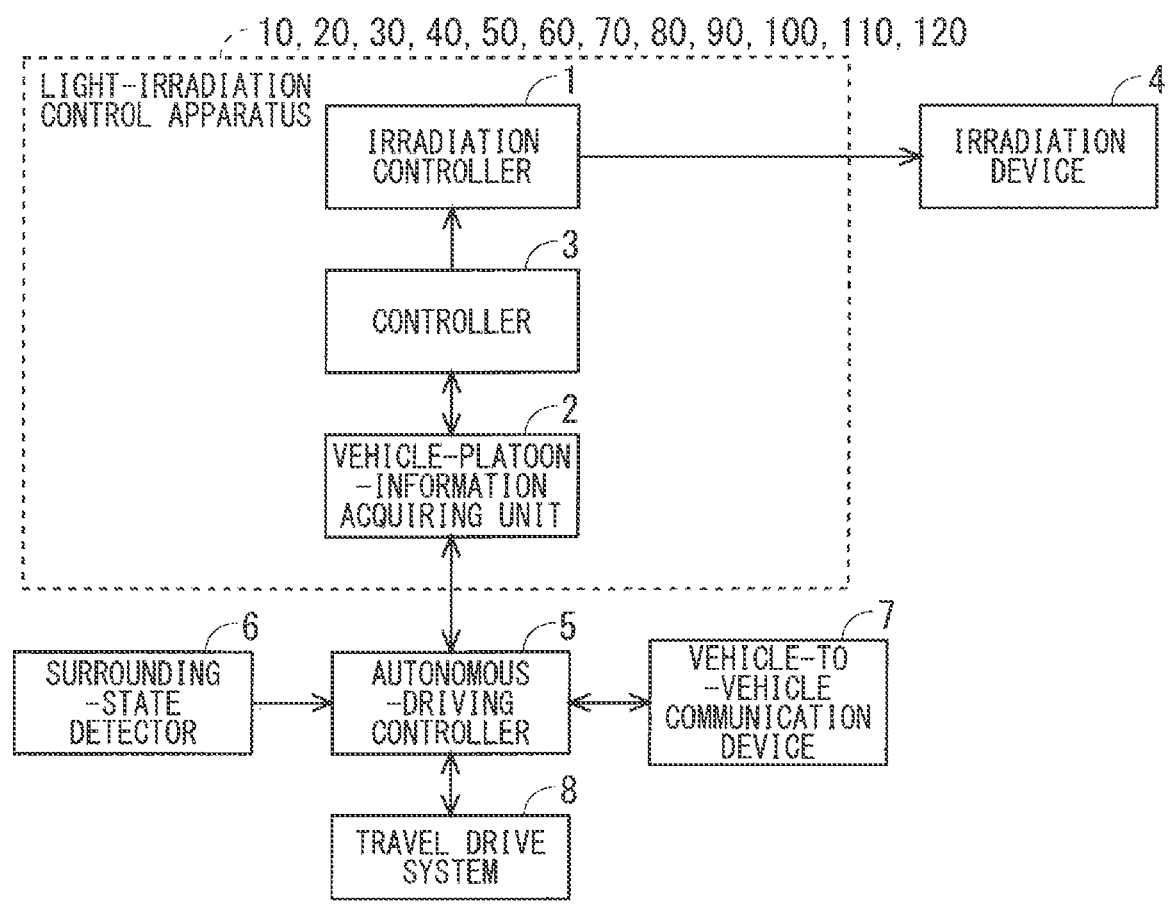
FIG. 2 is a block diagram showing the connection between the light-irradiation control apparatus according to the first embodiment and an autonomous-driving controller including other components.

FIG. 1 is a block diagram of a light-irradiation control apparatus 10 according to a first embodiment. FIG. 2 is a block diagram of the connection between the light-irradiation control apparatus 10 and an autonomous-driving controller 5 including other components. As shown in FIG. 1, the light-irradiation control apparatus 10 includes an irradiation controller 1, a vehicle-platoon-information acquiring unit 2, and a controller 3.

The irradiation controller 1 controls an irradiation device 4 that casts light upon a road. The vehicle-platoon-information acquiring unit 2 acquires information about the state of a vehicle platoon composed of a plurality of vehicles traveling closely together. The controller 3 controls the irradiation controller 1 in accordance with the information acquired by the vehicle-platoon-information acquiring unit 2.

As shown in FIG. 2, a vehicle is equipped with the autonomous-driving controller 5, a surrounding-state detector 6, and a vehicle-to-vehicle communication device 7 as well as the light-irradiation control apparatus 10. The surrounding-state detector 6 detects the state of vehicle's surroundings with a camera, radar, and other devices installed in the vehicle. The vehicle-to-vehicle communication device 7 performs communication between the vehicle and another vehicle. The autonomous-driving controller 5 controls a travel drive system S installed in the vehicle, in cooperation with the surrounding-state detector 6 and vehicle-to-vehicle communication device 7, The vehicle platoon herein is a group of vehicles that travel closely together while performing autonomous-driving control, such as trailing and platooning.

Figure 3:
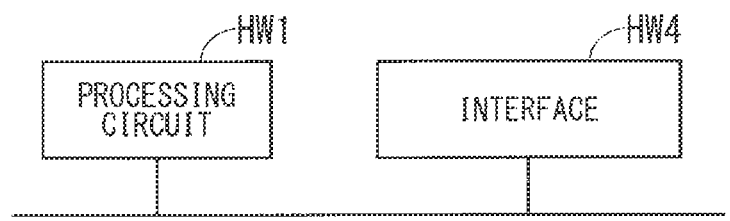
FIG. 3 is a diagram of the hardware configuration of the light-irradiation control apparatus according to the first embodiment.

FIG. 3 is a diagram showing the hardware configuration of the light-irradiation control apparatus 10. The functions of the individual irradiation controller 1, vehicle-platoon-information acquiring unit 2, and controller 3 of the light-irradiation control apparatus 10 are implemented by a processing circuit HW1. In other words, the light-irradiation control apparatus 10 includes a processor for performing the following: controlling an output of the irradiation device 4 that casts light upon a road; acquiring information about the state of a vehicle platoon composed of a plurality of vehicles traveling closely together; controlling the irradiation device 4 of the vehicle in accordance with the information about the vehicle platoon; while the vehicle belongs to the vehicle platoon, performing control in such a manner that the irradiation device 4 of the vehicle casts light in a steady-state mode that is common in the vehicle platoon; in a process where the vehicle alone or the vehicle platoon to which the vehicle belongs, merges with another of the vehicle alone or another of the vehicle platoon, performing control in such a manner that the irradiation device 4 of the merging vehicle casts light in a transition mode that is different from the steady-state mode; and in a process where the vehicle alone belonging to the vehicle platoon or a plurality of vehicles belonging to the vehicle platoon leaves the vehicle platoon, performing control in such a manner that the irradiation device 4 of the leaving vehicle casts light in the transition mode. The processing circuit HW1 may be dedicated hardware or a CPU (e.g., a central processing unit, a central processor, a processing unit, a calculator, a microprocessor, a microcomputer, a processor, or a digital signal processor or DSP for short) that executes a program stored in a memory.

For dedicated hardware serving as the processing circuit HW1, examples of the processing circuit HW1 include a single circuit, a complex circuit, a programmed processor, a parallel-programmed processor, an application specific integrated circuit (ASIC), a field-programmable gate array (FPGA), and a combination thereof. The functions of the individual irradiation controller 1, vehicle-platoon-information acquiring unit 2, and controller 3 may be implemented separately by processing circuits. Alternatively, these functions may be integrated together, and implemented by a single processing circuit.

Figure 4:
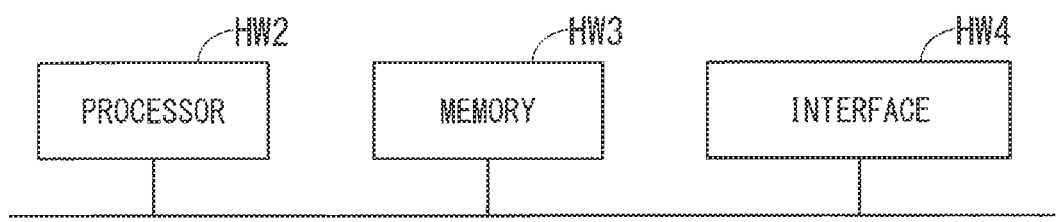
FIG. 4 is a diagram of the hardware configuration of the light-irradiation control apparatus according to the first embodiment.

For a processor serving as the processing circuit HW1, the functions of the individual irradiation controller 1, vehicle-platoon-information acquiring unit 2, and controller 3 are implemented in combination with software and other things (e.g., software, firmware, or a combination of software and firmware). The software and other things is written as a program and stored in a memory HW3. FIG. 4 shows a processor HW2 serving as the processing circuit HW1. The processor HW2 reads and executes a program stored in the memory HW3 to implement the functions of the individual components. In other words, the light-irradiation control apparatus 10 includes the memory HW3 for storing a program which, when executed by the processing circuit HW1, performs the following process steps: controlling an output of the irradiation device 4 that casts light upon a road, acquiring information about a vehicle platoon composed of a plurality of vehicles traveling closely together; controlling the irradiation device 4 of the vehicle in accordance with the information about the vehicle platoon; while the vehicle belongs to the vehicle platoon, performing control in such a mauler that the irradiation device 4 of the vehicle casts light in a steady-state mode that is common in the vehicle platoon; in a process where the vehicle alone or the vehicle platoon to which the vehicle belongs, merges with another of the vehicle alone or another of the vehicle platoon, performing control in such a manner that the irradiation device 4 of the merging vehicle casts light in a transition mode that is different from the steady-state mode; and in a process where the vehicle alone belonging to the vehicle platoon or a plurality of vehicles belonging to the vehicle platoon leaves the vehicle platoon, performing control in such a manner that the irradiation device 4 of the leaving vehicle casts light in the transition mode. The aforementioned programs are for a computer to execute the procedure or method of the irradiation controller 1, vehicle-platoon-information acquiring unit 2, and controller 3. The memory HW3 may be a volatile or non-volatile semiconductor memory (e.g., a random access memory or RAM for short, a read only memory or ROM for short, a flash memory, an erasable programmable read only memory or EPROM for short, or an electrically erasable programmable read only memory or EEPROM for short), a magnetic disk, a flexible disk, an optical disk, a compact disk, a mini disk, a DVD, or other things. Alternatively, the memory HW3 may be any type of storing medium that will be used in the future.

Some of the functions of the irradiation controller 1, vehicle-platoon-information acquiring unit 2, and controller 3 may be implemented by dedicated hardware, and the others may be implemented by software or firmware. As described above, the processing circuit HW1 can implement the aforementioned individual functions by hardware, software, firmware, or a combination thereof.

FIGS. 3 and 4 show an interface HW4. The interface HW4 is used for connection with a device external to the light-irradiation control apparatus 10, such as the autonomous-driving controller 5.

Operation

Figure 5:
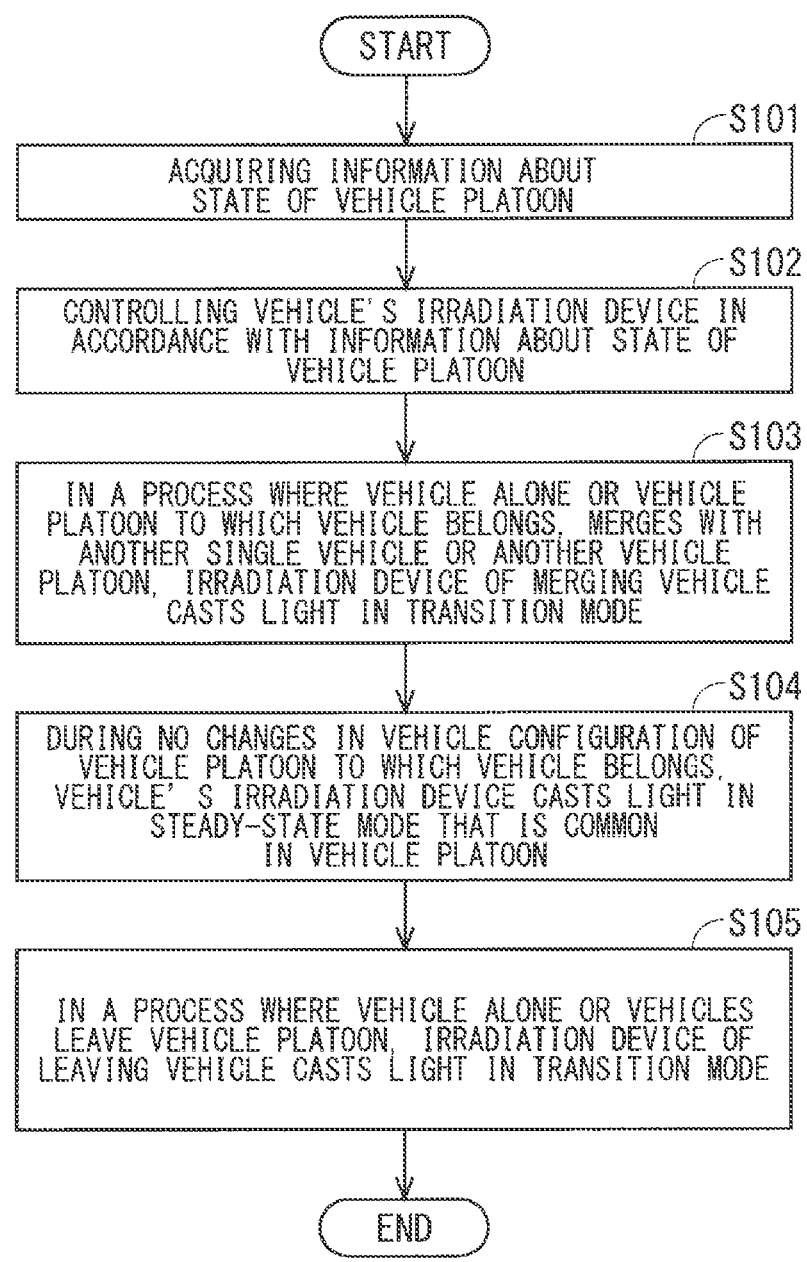
FIG. 5 is a flowchart showing the operation of the light-irradiation control apparatus according to the first embodiment.

FIG. 5 is a flowchart showing the operation of the light-irradiation control apparatus 10. The vehicle-platoon-information acquiring unit 2 acquires information about the state of the vehicle platoon (Step S101). Examples of the information about the state of the vehicle platoon include information indicating that the vehicle alone or vehicle platoon merges with another of the vehicle alone or another of the vehicle platoon, information indicating the separation of the vehicle alone or vehicle platoon, information indicating the vehicle configuration of the vehicle platoon, and information indicating an irradiation mode of these vehicles. The controller 3 controls the irradiation device 4 of the vehicle in accordance with the information about the state of the vehicle platoon (Step S102).

In a process where the vehicle alone or the vehicle platoon to which the vehicle belongs, merges with another of the vehicle alone or another of the vehicle platoon, the controller 3 performs control in such a manner that the irradiation device 4 of the merging vehicle casts light in a transition mode that is different from a steady-state mode (Step S103).

During no changes in the vehicle configuration of the vehicle platoon to which the vehicle belongs, the controller 3 performs control in such a manner that the irradiation device 4 of the vehicle casts light in the steady-state mode that is common in the vehicle platoon (Step S104).

In a process where the vehicle alone belonging to the vehicle or multiple vehicles belonging to the vehicle platoon leave the vehicle platoon, the controller 3 performs control in such a manner that the irradiation device 4 of the leaving vehicle casts light in the transition mode (Step S105).

The steady-state mode herein is a mode indicating no changes in the vehicle configuration of the vehicle platoon, and is, for instance, a mode of surrounding the vehicle or vehicle platoon with light in the form of a frame casted on a road. The transition mode is a mode indicating that the vehicle configuration of the vehicle platoon is under transition, and is, for instance, an irradiation mode in which its element is partly in common with an element of the steady-state mode. Examples of an element of the irradiation mode include the color of light casted upon a road and the shape of the outline of light casted upon the road. The transition mode is a mode in which the color of light and the shape of the outline of casted light are the same as those in the steady-state mode, and in which the light flashes on and off. The transition mode may be a mode in which the shape of the outline of casted light is the same as that in the steady-state mode, and in which the color of light is different from that of the light casted in the steady-state mode. The transition mode may be a mode in which the color of light and the shape of the outline of casted light are the same as those in the steady-state mode, and in which the inside of the light in the form of a frame is irradiated with a different color of light.

Effect

The light-irradiation control apparatus 10 in the first embodiment controls the irradiation device 4 that is installed in a vehicle and casts light upon a road. The light-irradiation control apparatus 10 includes the following: the irradiation controller 1 that controls an output of the irradiation device 4 that casts light upon a road; the vehicle-platoon-information acquiring unit 2 that acquires information about the state of a vehicle platoon composed of a plurality of vehicles closely traveling together; and the controller 3 that controls the irradiation controller 1 in accordance with the information acquired by the vehicle-platoon-information acquiring unit 2. During no changes in the vehicle configuration of the vehicle platoon to which the vehicle belongs, the controller 3 controls the irradiation controller 1 in such a manner that the irradiation device 4 of the vehicle casts light in a steady-state mode that is common in the vehicle platoon. In a process where the vehicle alone or the vehicle platoon to which the vehicle belongs, merges with another of the vehicle alone or another of the vehicle platoon, the controller 3 controls the irradiation controller 1 in such a manner that the irradiation device 4 of the merging vehicle casts light in a transition mode that is different from the steady-state mode. In a process where the vehicle alone belonging to the vehicle platoon or multiple vehicles belonging to the vehicle platoon leaves the vehicle platoon, the controller 3 controls the irradiation controller 1 in such a manner that the irradiation device 4 of the leaving vehicle casts light in the transition mode.

In the light-irradiation control apparatus 10 and method of light irradiation control in the first embodiment, control is performed in such a manner that the irradiation device 4 casts light upon the road in the transition mode, different from the steady-state mode, in the process where the vehicle alone or the vehicle platoon merges with or leaves another of the vehicle alone or another of the vehicle platoon. The light-irradiation control apparatus 10 and method thus enable the driver of a vehicle traveling around the vehicle platoon, to visually become aware that the vehicle configuration of the vehicle platoon is changing. The driver of the vehicle traveling around the vehicle platoon can consequently expect the movement of the vehicle platoon easily. The vehicle platoon accordingly less bears burdens (e.g., avoidance control) resulting from incautious movements of the vehicle traveling around the vehicle platoon. This reduces travel control processes in the vehicle platoon.

The light-irradiation control apparatus 10 in the first embodiment is configured such that the transition mode contains an element that is in common with the steady-state mode. Establishing such a transition mode as to contain an element that is in common with the steady-state mode enables an expression that the transition mode is a mode changed from the steady-state mode.

The light-irradiation control apparatus 10 in the first embodiment is configured such that the steady-state mode is a mode in which light casted upon the road does not flash on and off, and that the transition mode is a mode in which the same color of light as that in the steady-state mode flashes on and off. Establishing the transition mode as a mode in which the same color of light as that in the steady-state mode flashes on and off enables an expression that the transition mode is a mode indicating that the vehicle configuration of the vehicle platoon is changing.

The light-irradiation control apparatus 10 in the first embodiment may be configured such that in the transition mode, the light casted upon the road has an outline whose shape is the same as that of the outline of the light casted in the steady-state mode, and in the transition mode, the light casted upon the road has a color different from the color of the light casted in the steady-state mode. Establishing the transition mode as a mode in which the shape of the outline is the same as that in the steady-state mode and the color of the light is different from that of the light casted in the steady-state mode, enables an expression that the transition mode is a mode indicating that the vehicle configuration of the vehicle platoon is changing.

Second Embodiment

The configuration of a light-irradiation control apparatus 20 in a second embodiment, which is the same as that of the light-irradiation control apparatus 10 (c.f., FIG. 1) in the first embodiment, will not be elaborated upon. The light-irradiation control apparatus 20 in the second embodiment includes components identical to those included in the light-irradiation control apparatus 10. These identical components are denoted by the same reference signs, and common descriptions will not be elaborated upon.

Figure 6:
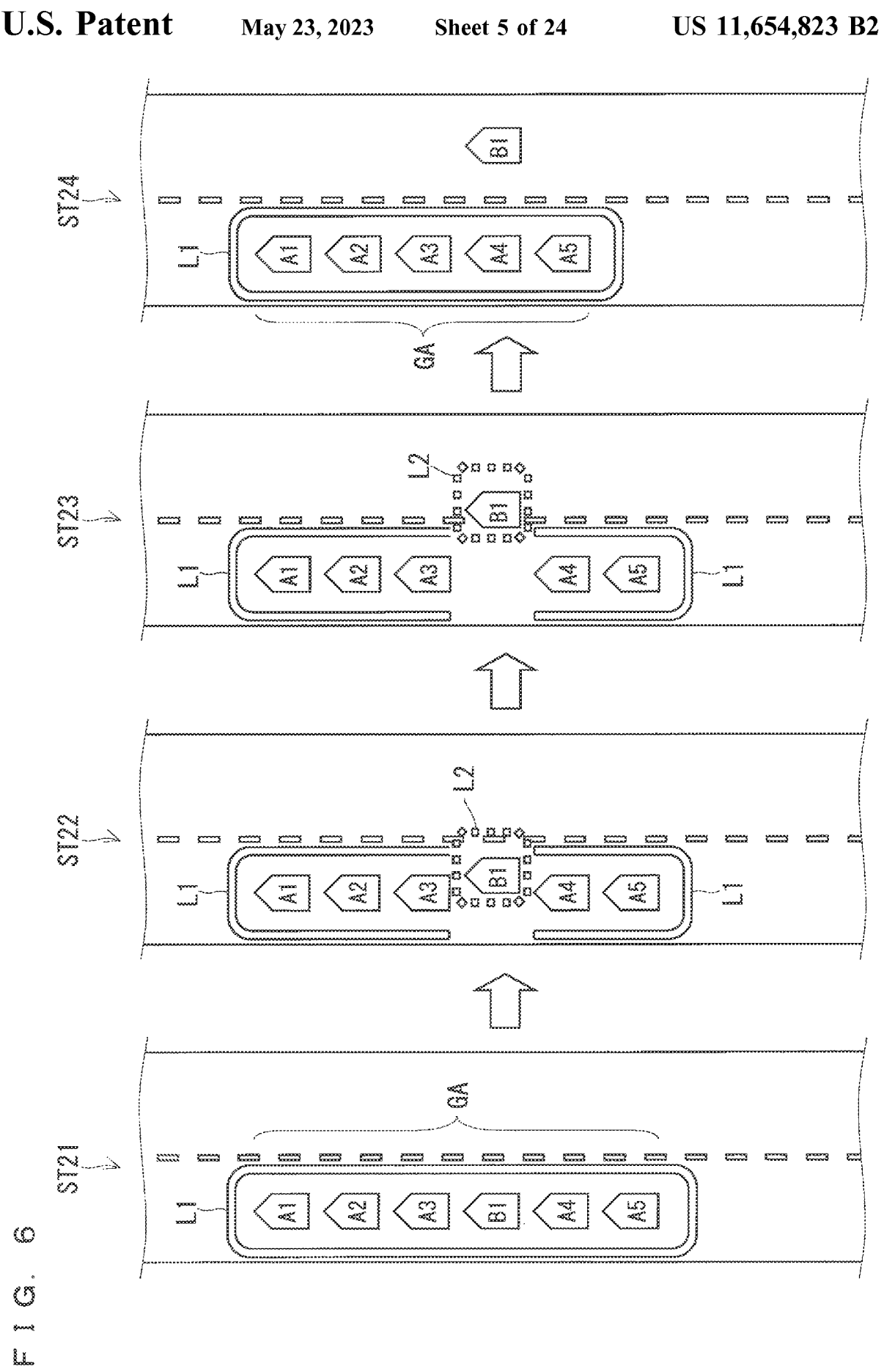
FIG. 6 is a schematic diagram illustrating the operation of a light-irradiation control apparatus according to a second embodiment.

FIG. 6 is a schematic diagram illustrating the operation of the light-irradiation control apparatus 20. Stages ST 21 to ST24 in FIG. 6 show how a vehicle B1 alone leaves a vehicle platoon GA consisting of vehicles A1 to A5 and B1.

In Stage ST21, the controllers 3 of the light-irradiation control apparatuses 20 installed in the individual vehicles A1 to A5 and B1, belonging to the vehicle platoon GA, are controlling the respective irradiation controllers 1 in such a manner that the irradiation devices 4 cast light in a steady-state mode L1 that is common in the vehicle platoon GA. The steady-state mode L1 herein is a mode of road irradiation with a predetermined color of light in such a manner that the light surrounds the vehicle platoon GA, as shown in Stage ST21.

In Stage ST22, after the vehicle B1 starts leaving the vehicle platoon GA, the controller 3 of the light-irradiation control apparatus 20 installed in the vehicle B1 controls the irradiation controller 1 in such a manner that the irradiation device 4 casts light in a transition mode L2. The transition mode L2 herein is a mode that is different from the steady-state mode L1. An example of the transition mode L2 is a mode of road irradiation with the same color of light as that in the steady-state mode L1 flashing on and off. The irradiation device 4 of the vehicle B1 herein performs irradiation tilted in a direction where the vehicle B1 leaves the vehicle platoon GA. In Stage ST22, the vehicles A1 to A5 in the vehicle platoon continue irradiation in the steady-state mode L1, as is the case with Stage ST21.

In Stage ST23, the vehicle B1 completes separation from the vehicle platoon GA. Upon this completion, the controller 3 of the light-irradiation control apparatus 20 installed in the vehicle B1 controls the irradiation controller 1 in such a manner that the irradiation device 4 stops light irradiation, as shown in Stage ST24.

In Stages ST23 and ST24, the vehicles A1 to A5 in the vehicle platoon GA continue irradiation in the steady-state mode L1, as is the case with Stages ST21 and S122. As shown in Stage ST24, the separation of the vehicle B1 produces a space between the vehicles A3 and A4, which belongs to the vehicle platoon GA. The autonomous-driving controllers 5 installed in the vehicles A1 to A5 control the respective travel drive systems 8 to narrow the inter-vehicle distance between the vehicles A3 and A4. In Stages ST23 and ST24, the vehicles A1 to A5 in the vehicle platoon GA continue irradiation in the steady-state mode L1, as is the case with stages ST21 and ST22

Figure 7:
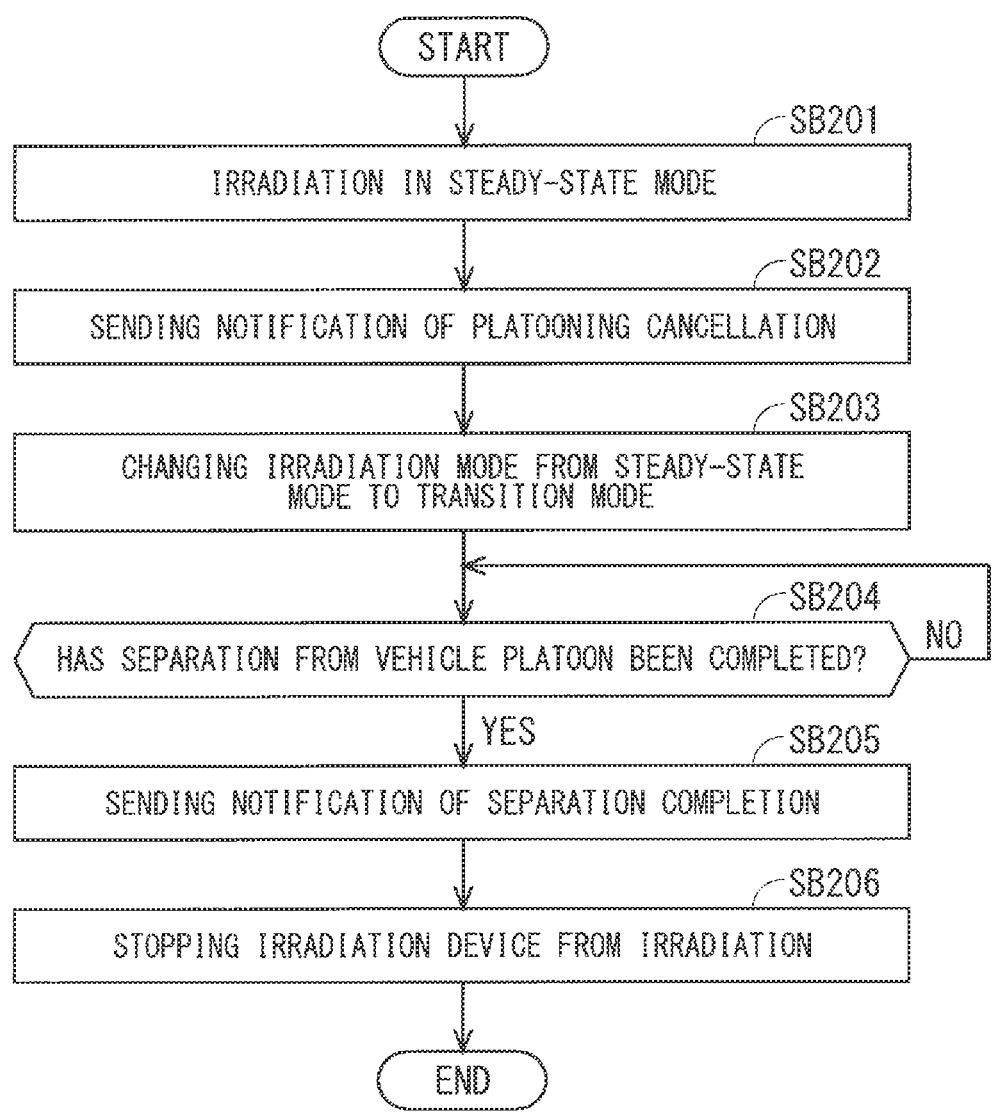
FIG. 7 is a flowchart showing the operation of a leaving vehicle shown in FIG. 6.

FIG. 7 is a flowchart showing the operation of the vehicle B1 in FIG. 6 that is leaving the vehicle platoon GA. In the initial state, the vehicle B1 is performing irradiation in the steady-state mode L1 (Step SB201). The controller 3 of the vehicle 91 next sends a notification of platooning cancellation to the vehicles A1 to A5, which belongs to the vehicle platoon. At the same time as when the vehicle B1 starts leaving the vehicle platoon, the irradiation device 4 of the vehicle 91 then changes its irradiation mode from the steady-state mode L1 to the transition mode L2 (Step SB203).

The controller 3 of the vehicle B1 next determines whether the vehicle B1 has completed separation from the vehicle platoon, in accordance with information about the vehicle platoon acquired by the vehicle-platoon-information acquiring unit 2 (Step SB204). Upon determination that the separation has been completed, the controller 3 of the vehicle B1 sends a notification of separation completion to the vehicles A1 to A5, which belongs to the vehicle platoon (Step SB205). The irradiation device 4 of the vehicle B1 then stops light irradiation (Step SB206).

Figure 8:
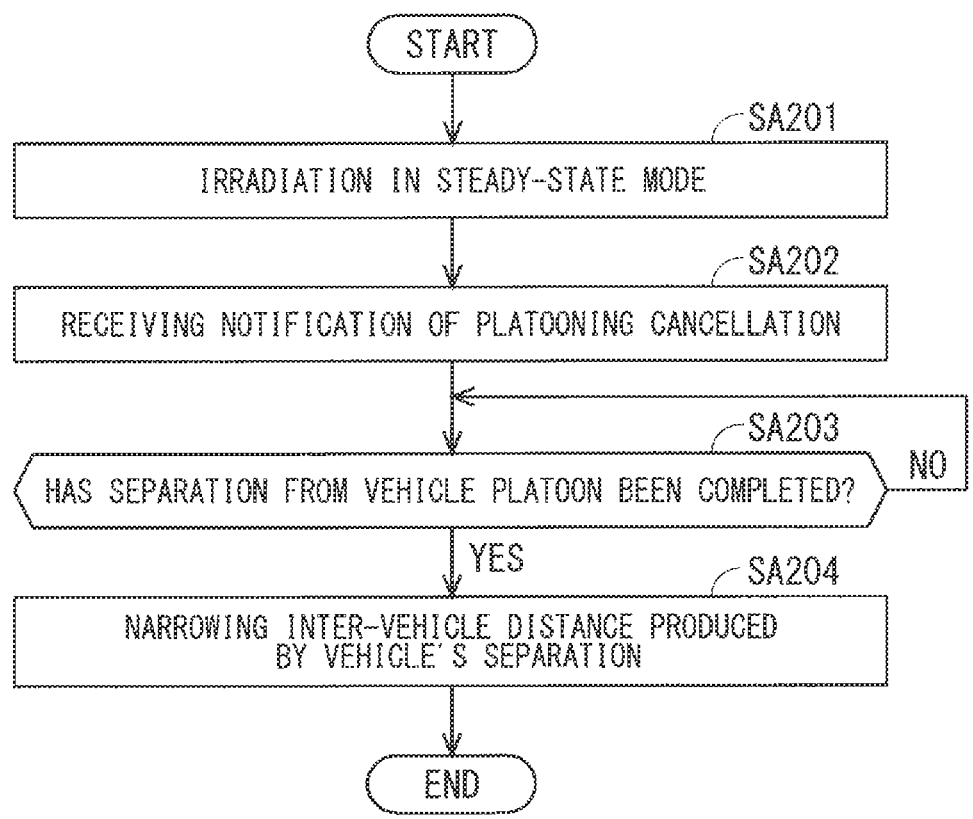
FIG. 8 is a flowchart showing the operation of a vehicle platoon shown in FIG. 6.

FIG. 8 is a flowchart showing the operation of the vehicles A1 to A5 in FIG. 6, which belong to the vehicle platoon GA. The following describes the operation of the vehicle A1 by way of example. The vehicles A2 to A5 operate similarly. In the initial state, the vehicle A1 is performing irradiation in the steady-state mode L1 (Step SA201). The controller 3 of the vehicle A next receives a notification of platooning cancellation from the vehicle B1 (Step SA202). The controller 3 of the vehicle A1 next determines whether the vehicle B1 has completed separation from the vehicle platoon GA (Step SA203). Upon receiving the notification of platooning cancellation from the vehicle B1, the controller 3 of the vehicle A1 determines that the vehicle B1 has completed separation from the vehicle platoon GA. After the vehicle B1 has completed separation from the vehicle platoon GA, the autonomous-driving controllers 5 of the vehicles A1 to A5 control the respective travel drive systems 8 to narrow an inter-vehicle distance produced by the separation of the vehicle B1.

Effects

The light-irradiation control apparatus 20 in the second embodiment is configured such that when the vehicle B1, belonging to the vehicle platoon GA, separates alone from the vehicle platoon GA, upon completion of the separation of the vehicle B1, the controller 3 controls the irradiation controller 1 in such a manner that the irradiation device 4 of the vehicle B1 that has separated, stops light irradiation. The irradiation device 4 of the vehicle B1 that is now not platooning, no longer needs to perform irradiation. Stopping the irradiation device 4 from irradiation enables reduction in the energy consumption of the vehicle B1 that has left.

The light-irradiation control apparatus 20 in the second embodiment is configured such that the controller 3 controls the irradiation controller 1 in such a manner that the irradiation device 4 performs irradiation tilted in a direction where the vehicle B1 leaves the vehicle platoon GA. The irradiation device 4 performs irradiation tilted in a direction where the vehicle B1 that leaves the vehicle platoon GA, whereby the driver of a vehicle traveling around the vehicle platoon GA can effectively aware that the vehicle B1 is leaving the vehicle platoon GA. The vehicle platoon GA consequently less bears burdens (e.g., avoidance control) resulting from incautious movements of the vehicle traveling around the platoon. This reduces travel control processes in the vehicle platoon. GA.

Third Embodiment

The configuration of the light-irradiation control apparatus 30 in the third embodiment, which is the same as that of the light-irradiation control apparatus 10 (c.f., FIG. 1) in the first embodiment, will not be elaborated upon. The light-irradiation control apparatus 30 in the third embodiment includes components identical to those included in the light-irradiation control apparatus 10. These identical components are denoted by the same reference signs, and common descriptions will not be elaborated upon.

Figure 9:
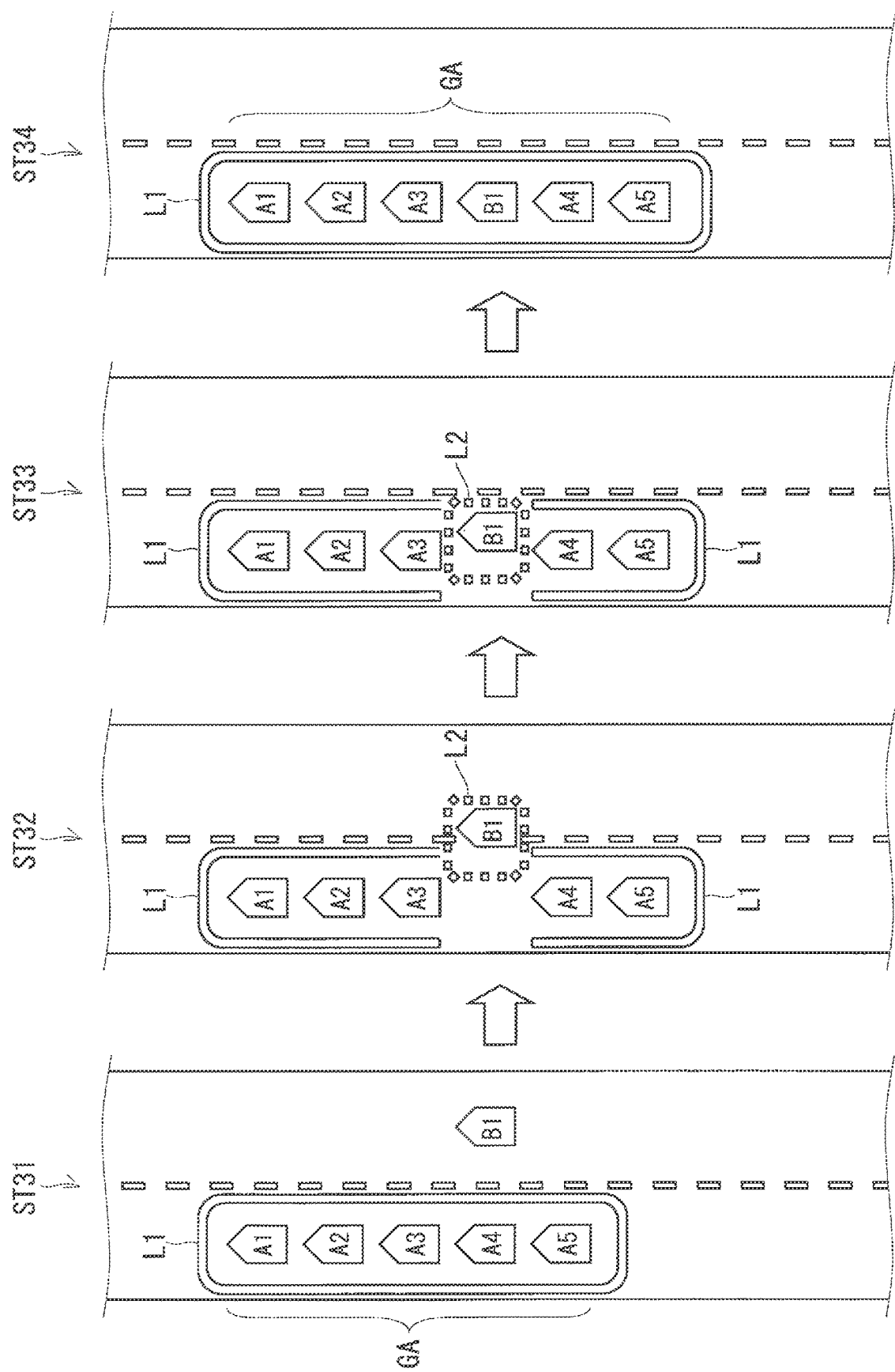
FIG. 9 is a schematic diagram illustrating the operation of a light-irradiation control apparatus according to a third embodiment.

FIG. 9 is a schematic diagram illustrating the operation of the light-irradiation control apparatus 30. Stages ST31 to ST34 in FIG. 9 show how a vehicle B1 traveling separately merges with a vehicle platoon GA consisting of vehicles A1 to A5.

In Stage ST31, the controllers 3 of the vehicles A1 to A5, belonging to the vehicle platoon GA, are controlling the respective irradiation controls 1 in such a mariner that the irradiation devices 4 cast light in a steady-state mode L1 that is in common with the vehicle platoon GA. In Stage ST31, the vehicle B1 traveling separately is not performing irradiation.

In Stage ST32, the autonomous-driving controllers 5 installed in the vehicles A1 to A5 control the respective travel drive systems 8 to widen the inter-vehicle distance between the vehicles A3 and A4. The vehicle B1 then starts merging with the vehicle platoon GA so as to come between the vehicles A3 and A4. Upon start of the mergence, the controller 3 of the light-irradiation control apparatus 30 installed in the vehicle B1 controls the irradiation controller 1 in such a manner that the irradiation device 4 casts light in a transition mode L2. The transition mode L2 herein is a mode that is different from the steady-state mode L1. An example of the transition mode L2 is a mode of road irradiation with the same color of light as that in the steady-state mode L1 flashing on and off. The irradiation device 4 of the vehicle B1 herein performs irradiation tilted in a direction where the vehicle B1 merges with the vehicle platoon GA. In Stage ST32, the vehicles A1 to A5, belonging to the vehicle platoon GA, continue irradiation in the steady-state mode L1, as is the case with Stage ST31.

After the vehicle B1 has completed mergence with the vehicle platoon GA in Stage ST33, the controller 3 of the light-irradiation control apparatus 30 installed in the vehicle B1, as shown in Stage ST34, controls the irradiation controller 1 in such a manner that the irradiation device 4 casts light in the steady-state mode L1. In Stages ST33 and ST34, the vehicles A1 to A5, belonging to the vehicle platoon GA, continue irradiation in the steady-state mode L1, as is the case with Stages ST31 and ST32.

Figure 10:
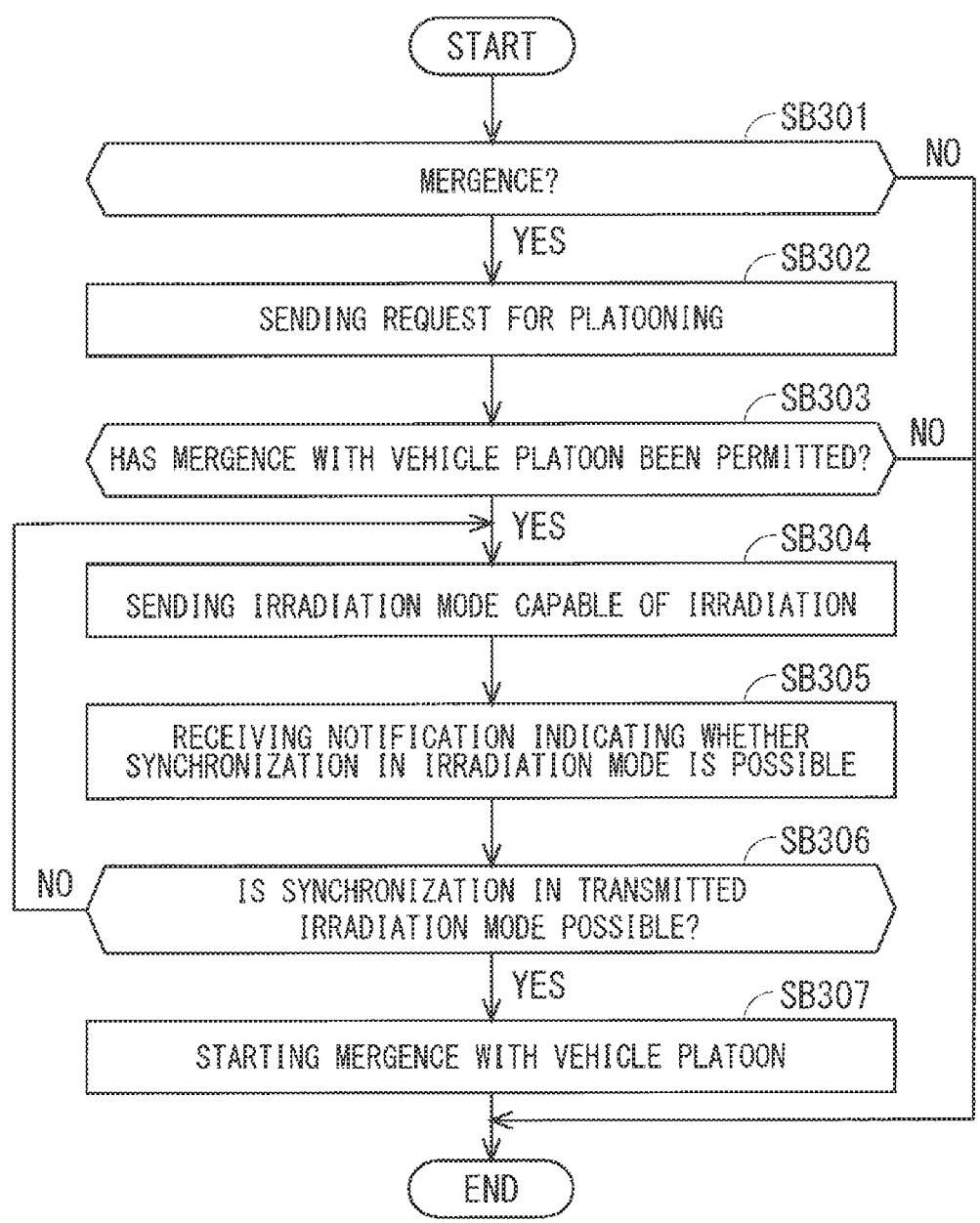
FIG. 10 is a flowchart showing the operation of a merging vehicle shown in FIG. 9.

FIG. 10 is a flowchart showing how the vehicle B1 in FIG. 9 operates before it merges with the vehicle platoon GA. In the following description, the vehicle B1 communicates with the vehicle A1 representative of the vehicle platoon GA. The controller 3 of the vehicle B1 first determines whether to merge with the vehicle platoon GA (Step SB301). The vehicle B1 previously has a set value or performance instruction indicating whether to merge with the vehicle platoon GA (i.e., whether to join in the vehicle platoon GA). The controller 3 makes such a determination by referring to this set value or performance instruction. It is noted that the set value or performance instruction is changeable at any timing by a user. Upon determining to merge with the vehicle platoon GA, the controller 3 of the vehicle B1 sends a request for platooning to the vehicle A1, representative of the vehicle platoon GA (Step SB302). The controller 3 of the vehicle B1 next determines whether the vehicle B1 has been permitted to merge with the vehicle platoon GA (Step SB303). Upon receiving a notification of platooning permission from the vehicle A1, the controller 3 of the vehicle B1 determines that the vehicle B1 has been permitted to merge with the vehicle platoon GA.

The controller 3 of the vehicle B1 next sends an irradiation anode in which the irradiation device 4 of the vehicle B1 is capable of irradiation, to the vehicle A1, representative of the vehicle platoon GA (Step SB304). The controller 3 of the vehicle B1 next receives a notification indicating whether synchronization is possible, from the vehicle A1, representative of the vehicle platoon GA. The controller 3 of the vehicle B1 determines whether synchronization in the irradiation mode that has been sent, is possible (Step SB306). The controller 3 of the vehicle B1 determines that synchronization in the transmitted irradiation mode is possible, when the vehicle B1 receives a notification indicating that synchronization is possible, from the vehicle A1, representative of the vehicle platoon GA, in Step SB305. If synchronization in the irradiation mode is determined to be possible, the vehicle B1 starts merging with the vehicle platoon GA (Step SB307). If synchronization is determined to be impossible in Step SB306, the process returns to Step SB304, and the controller 3 sends an irradiation mode in which the irradiation device 4 of the vehicle B1 is capable of irradiation and that has not yet been sent, to the vehicle A1, representative of the vehicle platoon GA.

Figure 11:
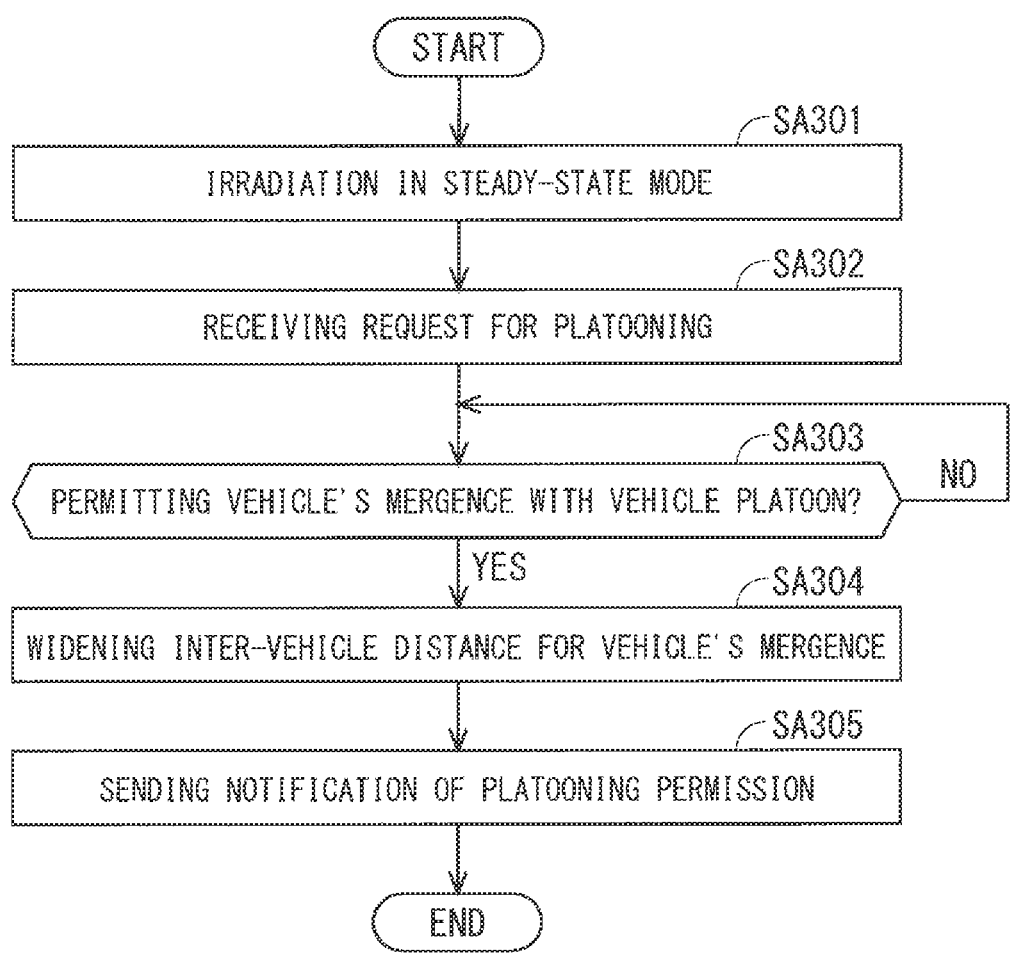
FIG. 11 is a flowchart showing an operation of receiving a request for platooning in the vehicle platoon shown in FIG. 9.

FIG. 11 is a flowchart showing how the vehicle A1, representative of the vehicle platoon GA, permits platooning. In the following description, the vehicle A1 is representative of the vehicle platoon GA. In the initial state, the vehicle platoon GA is performing irradiation in the steady-state mode L1 (Step SA301). The controller 3 of the vehicle A1 next receives a request for platooning from the vehicle B1 (Step SA302). The controller 3 of the vehicle A1 next determines whether to permit the vehicle B1 to merge with the vehicle platoon GA (Step SA303). Upon determining that the controller 3 of the vehicle A1 lets the vehicle B1 in, the autonomous-driving controllers 5 of the vehicles A1 to A5 control the respective travel drive systems 8 to widen an inter-vehicle distance for the vehicle B1 to merge (Step SA304). The controller 3 of the vehicle A1 sends a notification of platooning permission to the vehicle B1 (Step SA305).

Figure 12:
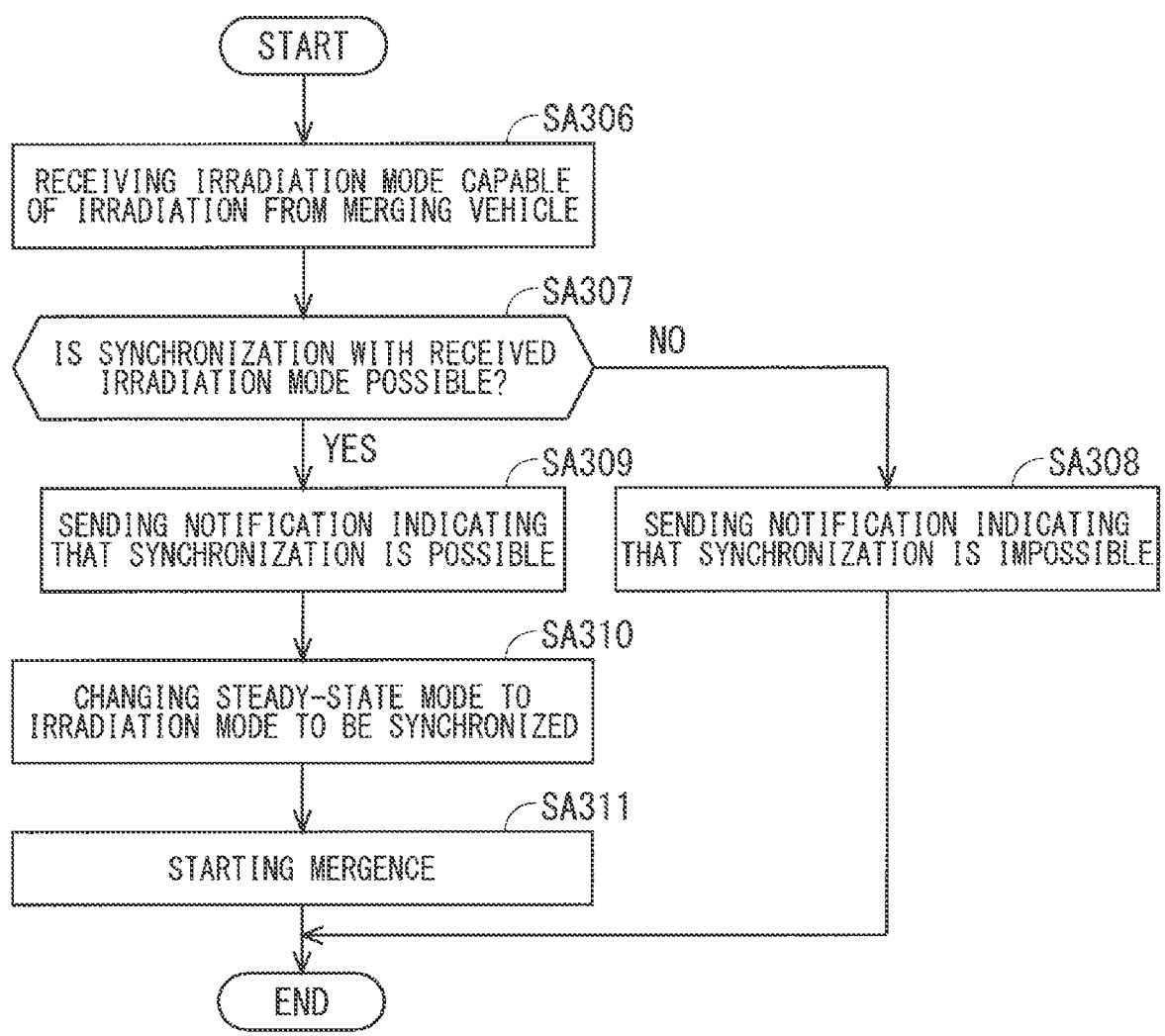
FIG. 12 is a flowchart showing an operation of receiving an irradiation mode in the vehicle platoon shown in FIG. 9.

FIG. 12 is a flowchart showing how an irradiation mode in the vehicle platoon GA synchronizes with an irradiation mode in the vehicle B1. In the following description, the vehicle A1 is representative of the vehicle platoon GA. The controller 3 of the vehicle A1 receives an irradiation mode in which the irradiation device of the margining vehicle B1 is capable of irradiation (Step SA306). The controller 3 of the vehicle A1 determines whether the irradiation mode in the irradiation devices 4 of the vehicles A1 to A3 can synchronize with the received irradiation mode (Step SA307). If synchronization is determined to be impossible, the controller 3 of the vehicle A1 sends a notification indicating that synchronization is impossible to the vehicle B1 (Step SA308).

If synchronization is determined to be possible, the controller 3 of the vehicle A1 sends a notification indicating that synchronization is possible to the vehicle B1 (Step SA309). Next, when an irradiation mode to be synchronized is different from the current irradiation mode, the controller 3 of the vehicle A1 controls the irradiation controllers 1 of the vehicles A1 to A5 in such a manner that the irradiation devices 4 cast light in the irradiation mode to be synchronized (i.e., in the steady-state mode L1 in FIG. 9) (Step SA310). The vehicles A1 to A5 in the vehicle platoon GA then start merging with the vehicle B1 (Step SA311).

Effects

The light-irradiation control apparatus 30 in the third embodiment is configured such that the controller 3 controls the irradiation controller 1 in such a manner that the irradiation device 4 performs irradiation tilted in a direction where the vehicle B1 merges with the vehicle platoon GA. Such irradiation in the irradiation device 4, which is tilted in a direction where the vehicle B1 merges with the vehicle platoon GA, more effectively enables the driver of a vehicle traveling around the vehicle platoon GA, to become aware that the vehicle B1 is merging with the vehicle platoon GA. The vehicle platoon GA consequently less bears burdens (e.g., avoidance control) resulting from incautious movements of the vehicle traveling around the platoon. This reduces travel control processes in the vehicle platoon GA.

Fourth Embodiment

The configuration of a light-irradiation control apparatus 40 in a fourth embodiment, which is the same as that in the light-irradiation control apparatus 10 (c.f., FIG. 1) in the first embodiment, will not be elaborated upon. The light-irradiation control apparatus 40 in the fourth embodiment includes components identical to those included in the light-irradiation control apparatus 10. These identical components are denoted by the same reference signs, and common descriptions will not be elaborated upon.

Figure 13:
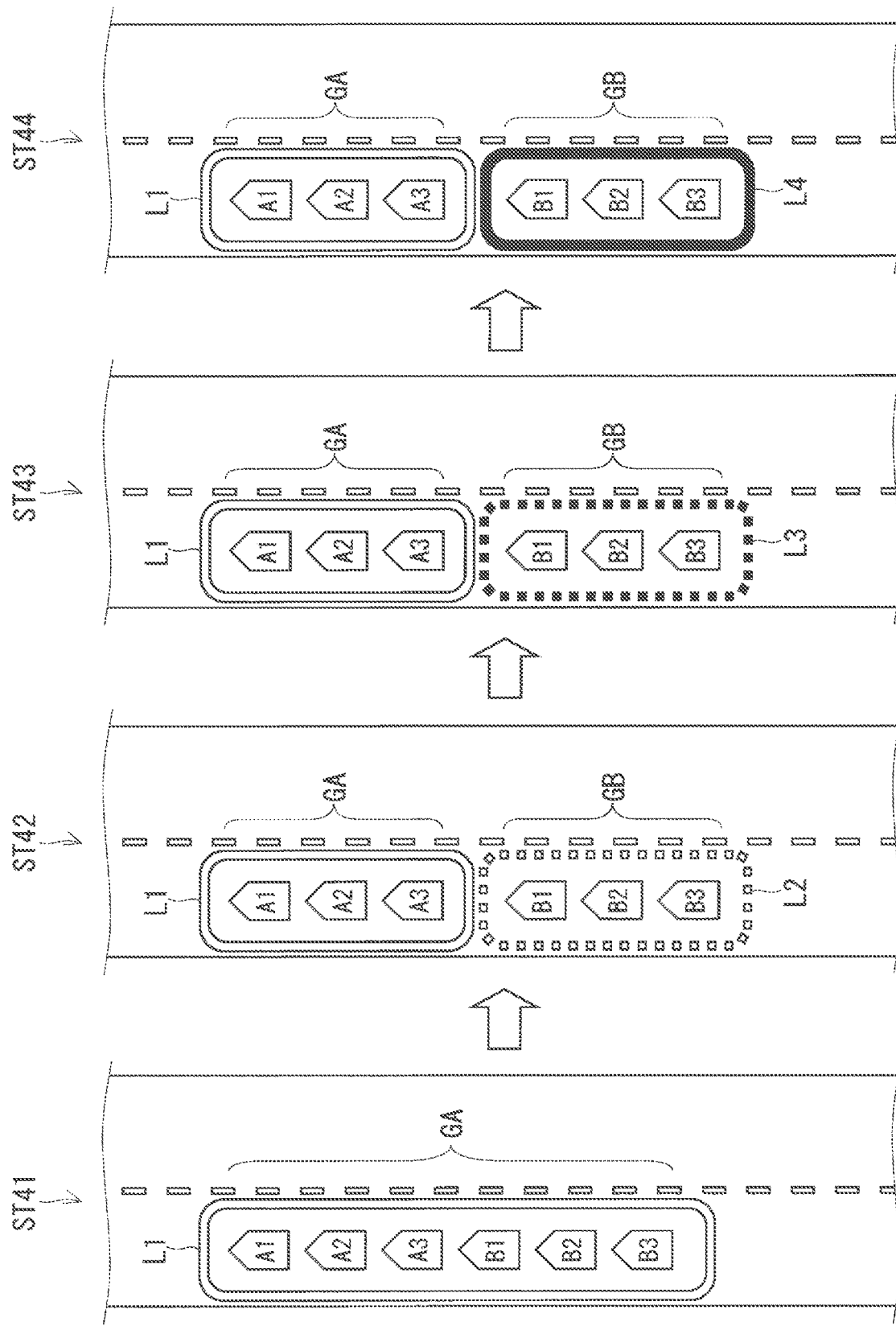
FIG. 13 is a schematic diagram illustrating the operation of a light-irradiation control apparatus according to a fourth embodiment.

FIG. 13 is a schematic diagram illustrating the operation of the light-irradiation control apparatus 40. Stages ST41 to ST44 in FIG. 13 show that vehicles B1 to B3 leave a vehicle platoon GA consisting of vehicles A1 to A3 and B1 to B3, to form a new vehicle platoon GB.

In Stage ST41, the controllers 3 of the light-irradiation control apparatuses 40 installed in the individual vehicles A1 to A3 and B1 to B3, belonging the vehicle platoon GA, are controlling the respective irradiation controllers 1 in such a manner that the irradiation devices 4 cast light in a steady-state mode L1 that is common in the vehicle platoon GA.

After the vehicles B1 to B3 starts leaving the vehicle platoon GA, the controllers 3 of the light-irradiation control apparatuses 40 installed in the individual vehicles B1 to B3 control the respective irradiation controllers 1 in such a manner that the irradiation devices 4 cast light in a transition mode L2. The transition mode L2 herein is a mode that is different from the steady-state mode L1. An example of the transition mode L2 is a mode in which the color of light and the shape of the outline of casted light are the same as those in the steady-state mode L1, and in which light flashes on and off.

In Stage ST43, the controllers 3 of the light-irradiation control apparatuses 40 installed in the individual vehicles B1 to B3 control the respective irradiation controllers 1 in such a manner that the irradiation mode in the irradiation devices 4 changes from the transition mode L2 to a transition mode L3. An example of the transition mode L3 is herein a mode of road irradiation with light having a color different from that of the light casted in the transition mode L2 flashing on and off.

In Stage ST44, after the vehicles B1 to B3 have completed separation from the vehicle platoon GA, the controllers 3 of the light-irradiation control apparatuses 40 installed in the vehicles B1 to B3 that form the new vehicle platoon GB, control the respective irradiation controllers 1 in such a manner that the irradiation devices 4 cast light in a steady-state mode L4, An example of the transition mode L4 herein is a mode in which the color of light and the shape of the outline of casted light are the same as those in the steady-state mode L3, and in which light does not flash on and off. It is noted that in Stages ST42 to ST44, the vehicles A1 to A3 in the vehicle platoon GA continue irradiation in the steady-state mode L1, as is the case with Stage ST41.

Figure 14:
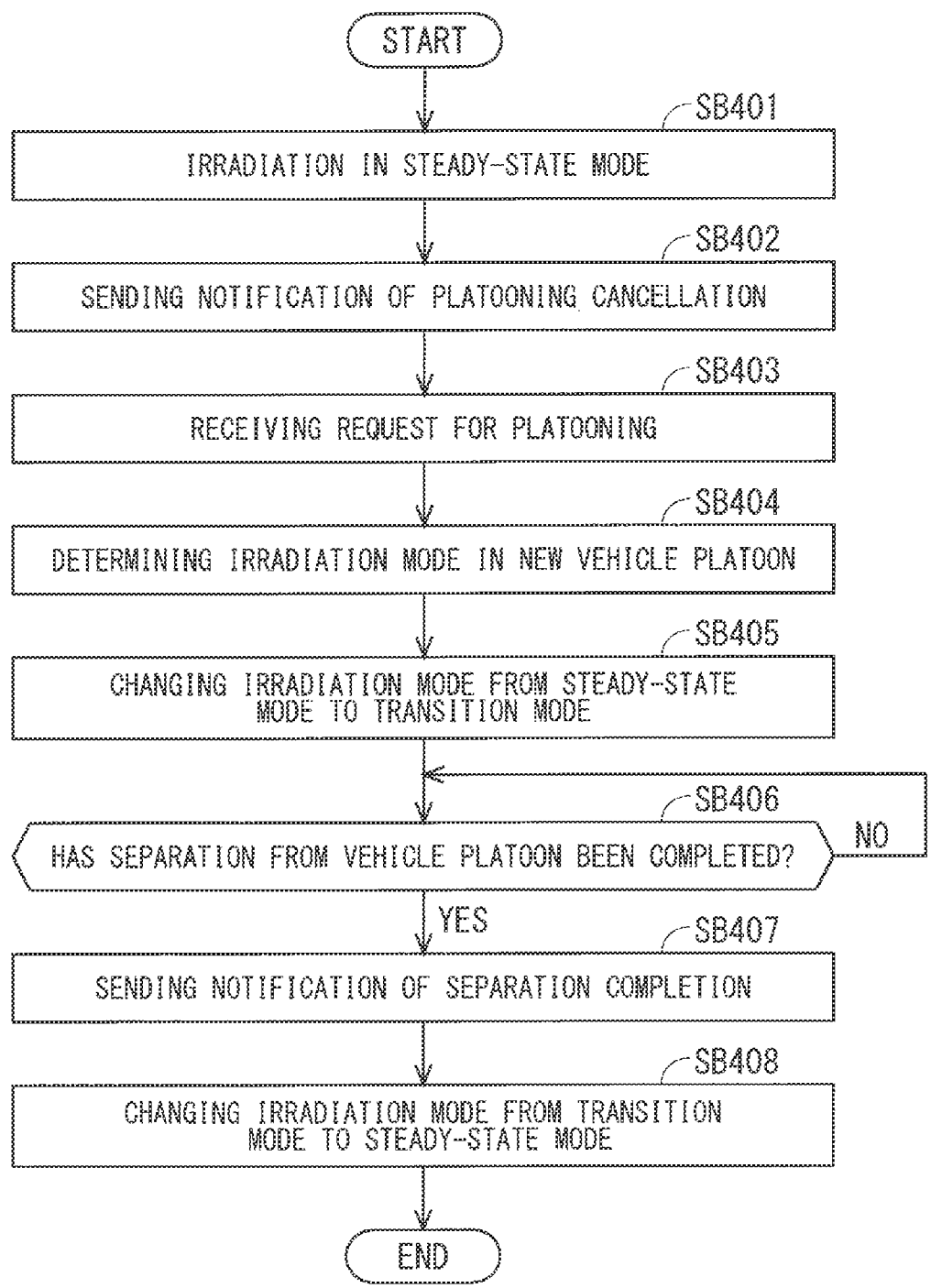
FIG. 14 is a flowchart showing the operation of a leaving vehicle shown in FIG. 13.

FIG. 14 is a flowchart showing the operation of the vehicle B1 in FIG. 13 that is leaving the vehicle platoon GA. In the initial step, the vehicle B1 is performing irradiation in the steady-state mode L1 (Step SB401). The controller 3 of the vehicle B1 next sends a notification of platooning cancellation to the vehicles A1 to A3, B2 and B3, belonging to the vehicle platoon GA. The controller 3 of the vehicle B1 then receives requests for platooning from the vehicles B2 and B3, which leave the vehicle platoon GA at the same time as the vehicle B1 to form the new vehicle platoon GB together with the vehicle B1 (Step SB403). The controller 3 of the vehicle B1 also communicates with the vehicles B2 and B3 to determine an irradiation mode (i.e., the steady-state mode L4 in FIG. 13) in which the irradiation device 4 performs irradiation when the new vehicle platoon GB is formed (Step SB404).

Subsequently, the irradiation mode in the irradiation device 4 of the vehicle B1 changes from the steady-state mode L1 to the transition mode L2 at the same time as the separation of the vehicle B1 from the vehicle platoon GA (Step SB405). At this time, the irradiation mode in the irradiation devices 4 of the vehicles B2 and B3 also change from the steady-state mode L1 to the transition mode L2. As shown in Stage ST43 in FIG. 13, the transition mode L2 in the irradiation devices 4 of the vehicles B1, B2 and B3 may change to the transition mode L3 in the middle of the separation.

The controller 3 of the vehicle B1 determines whether the vehicle B1 has completed separation from the vehicle platoon GA, in accordance with information about the vehicle platoon received by the vehicle-platoon-information acquiring unit 2. Upon determining that the separation has been completed, the controller 3 of the vehicle B1 sends a notification of separation completion to the vehicle A1 representative of the vehicle platoon GA (Step SB407). The vehicles B1, B2, and B3, forming the new vehicle platoon GB, then change their irradiation mode from the transition mode L2 (or transition mode L3) to the steady-state mode L4 (Step SB408).

Figure 15:
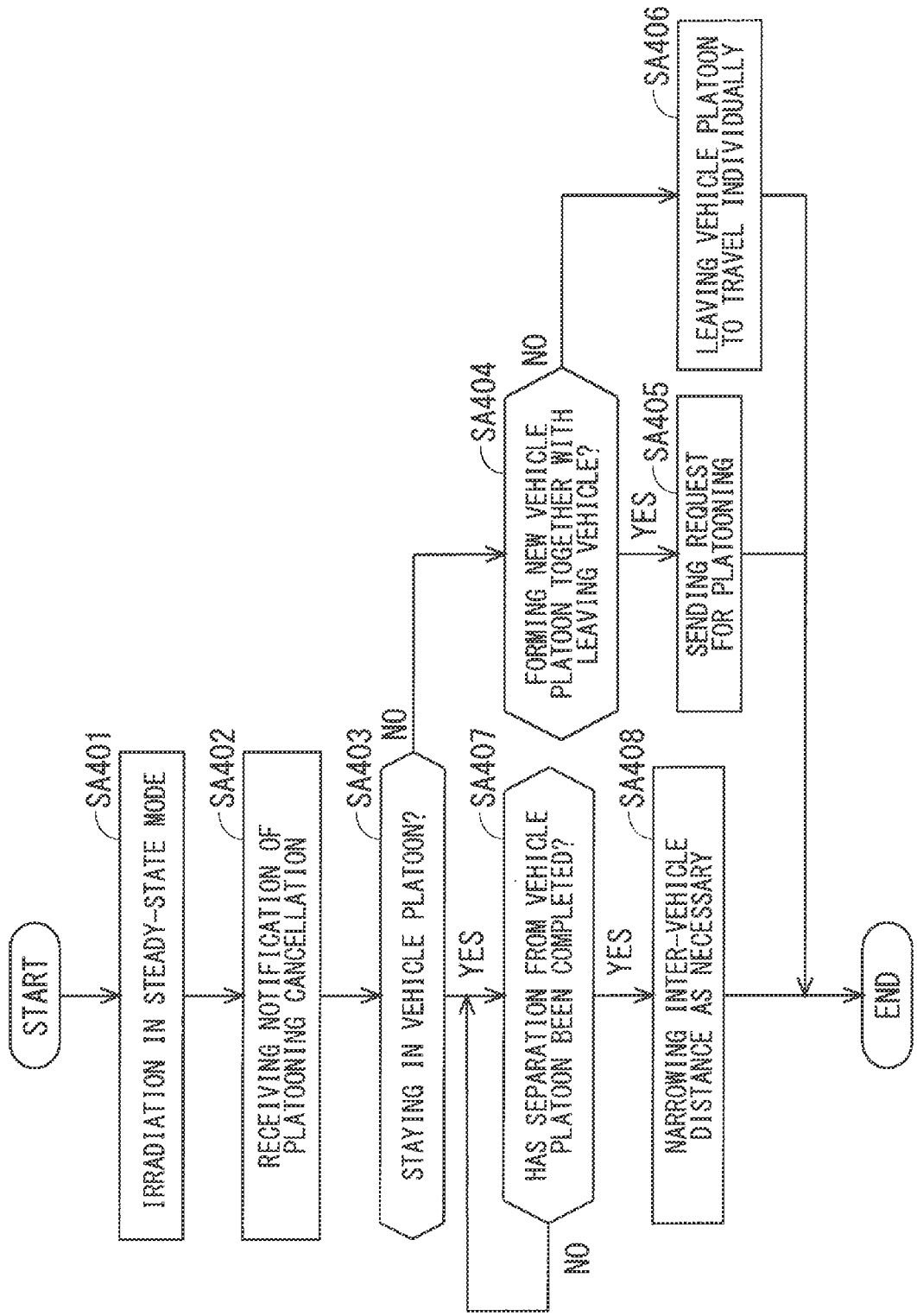
FIG. 15 is a flowchart showing the operation of a vehicle platoon shown in FIG. 13.

FIG. 15 is a flowchart showing the operation of the vehicles A1 to A3, B2, and B3 that receive a notification of platooning cancellation from the vehicle B1 in FIG. 13. Although the following describes the operation of the vehicle A1, the vehicles A2, A3, B2, and B3 operate similarly. In the initial state, the vehicles A1 to A3 and B1 to B3 in the vehicle platoon GA are performing irradiation in the steady-state mode L1 (Step SA401). The controller 3 of the vehicle A1 next receives a notification of platooning cancellation from the vehicle B1 (Step SA402).

The controller 3 of the vehicle A1 that has received the notification of platooning cancellation determines whether to stay in the vehicle platoon GA (Step SA403). If determining not to stay in the vehicle platoon GA, the controller 3 of the vehicle A1 determines whether to form the new vehicle platoon GB together with the leaving vehicle B1 (Step SA404). If determining to form the new vehicle platoon GB together with the leaving vehicle B1, the controller 3 of the vehicle A1 sends a request for platooning to the vehicle B1 (Step SA405). If determining not to form the new vehicle platoon GB together with the leaving vehicle B1, the vehicle A1 travels separately after leaving the vehicle platoon GA.

If determining to stay in the vehicle platoon GA in Step SA403, the controller 3 of the vehicle A1 determines whether the vehicle B1 has completed separation from the vehicle platoon GA (Step SA407). Upon receiving a notification of platooning cancellation from the vehicle B1, the controller 3 of the vehicle A1 determines that the vehicle B1 has completed separation from the vehicle platoon GA. After the vehicle B1 has completed separation from the vehicle platoon, the autonomous-driving controllers 5 of the vehicles A1 to A3 staying in the vehicle platoon GA control the respective travel drive systems 8 when adjustment, such as reduction in inter-vehicle distance, needs to be made (Step SA408).

Effects

The light-irradiation control apparatus 40 in the fourth embodiment is configured such that the controller 3 controls the irradiation controller 1 in such a manner that the irradiation device 4 of the vehicle B1 belonging to a first vehicle platoon (i.e., vehicle platoon GA) casts light in a first steady-state mode (i.e., steady-state mode L1) that is common in the first vehicle platoon. The light-irradiation control apparatus 40 is also configured such that in a process where the vehicles B1, B2, and B3 belonging to the first vehicle platoon leave the first vehicle platoon, the controller 3 controls the irradiation controller 1 in such a manner that the irradiation device 4 of the leaving vehicle B1 casts light in the transition mode L2 (or transition mode L3) that is different from the first steady-state mode. The light-irradiation control apparatus 40 is also configured such that after the vehicles B1, B2 and B3 that have left the first vehicle platoon form a second vehicle platoon (i.e., vehicle platoon GB), the controller 3 controls the irradiation controller I in such a manner that the irradiation device 4 of the vehicle B1 belonging to the second vehicle platoon casts light in a second steady-state mode (i.e., steady-state mode L4) that is common in the second vehicle platoon.

Such a configuration enables the driver of a vehicle traveling around the vehicle platoon GA, to visually become aware that the vehicles B1, B2, and B3 are together leaving the vehicle platoon GA. In addition, this configuration enables the driver of the vehicle traveling around the vehicle platoon GA, to visually become aware that the vehicles B1, B2, and B3 that have left, are forming the vehicle platoon GB. The driver of the vehicle traveling around the vehicle platoons GA and GB can consequently expect the movements of the vehicle platoons GA and GB easily. The vehicle platoons GA and GB thus less bear burdens (e.g., avoidance control) resulting from incautious movements of the vehicle traveling around the platoons. This reduces travel control processes in the vehicle platoons GA and GB.

The light-irradiation control apparatus 40 in the fourth embodiment is also configured such that the transition mode L2 (or transition mode L3) contains an element that is in common with the first steady-state mode (i.e., steady-stole mode L1), and contains an element that is in common with the second steady-state mode (i.e., steady-state mode L4). In the fourth embodiment, the mode changes to the steady-state mode L1, followed by the transition mode L2 (or transition mode L3), followed by the steady-state mode L4. Defining the shape of the outline of casted light as a common element in these modes, for instance, enables the irradiation mode to smoothly change while inheriting part of the element of the preceding irradiation mode. This more effectively enables the driver of the vehicle traveling around the vehicle platoons GA and GB, to visually become aware of changes in the vehicle configuration of the vehicle platoons GA and GB.

Fifth Embodiment

The configuration of a light-irradiation control apparatus 50 in a fifth embodiment, which is the same as that in the light-irradiation control apparatus 10 (c.f., FIG. 1) in the first embodiment, will not be elaborated upon. The light-irradiation control apparatus 50 in the fifth embodiment includes components identical to those included in the light-irradiation control apparatus 10. These identical components are denoted by the same reference signs, and common descriptions will not be elaborated upon.

Figure 16:
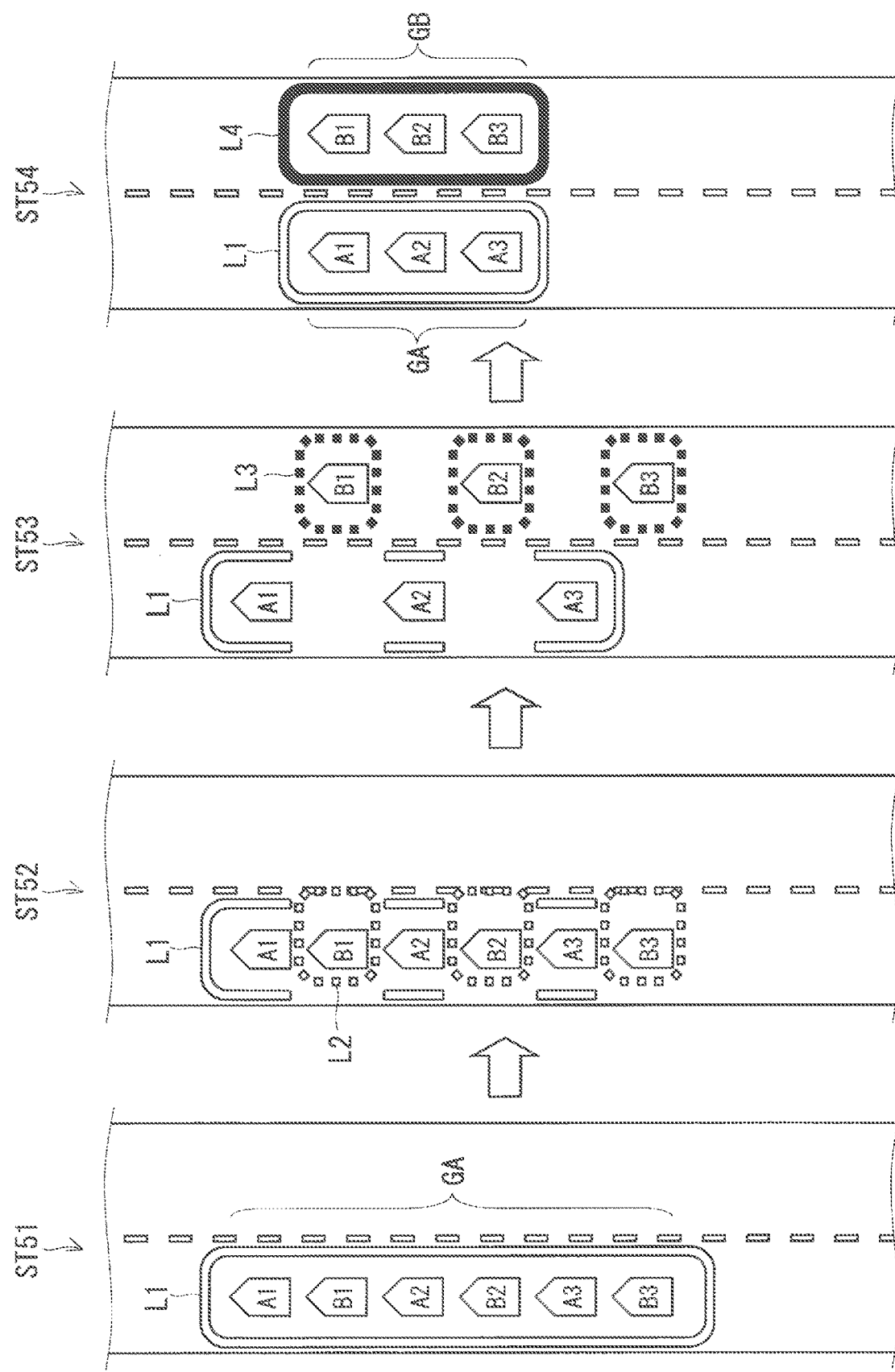
FIG. 16 is a schematic diagram illustrating the operation of a light-irradiation control apparatus according to a fifth embodiment.

FIG. 16 is a schematic diagram illustrating the operation of the light-irradiation control apparatus 50. Stages ST51 to ST54 in FIG. 16 show that vehicles B1 to B3 leave a vehicle platoon GA consisting of vehicles A1 to A3 and B1 to B3, to form a new vehicle platoon GB.

In Stage ST51, the controllers 3 of the light-irradiation control apparatuses 50 installed in the individual vehicles A1 to A3 and B1 to B3, belonging to the vehicle platoon GA, are controlling the respective irradiation controllers 1 in such a manner that the irradiation devices 4 cast light in a steady-state mode L1 that is common in the vehicle platoon GA.

In Stage ST52, the vehicles B1 to B3 start leaving the vehicle platoon GA while making a lane change to the right. After the vehicles B1 to B3 start separation, the controllers 3 of the light-irradiation control apparatuses 50 installed in the individual vehicles B1 to B3 control the respective irradiation controllers 1 in such a manner that the irradiation devices 4 cast light in a transition mode L2. The transition mode L2 is a mode that is different from the steady-state mode L1. An example of the transition mode L2 is a mode of road irradiation with the same color of light as that in the steady-state mode L1 flashing on and off. Here, the irradiation devices 4 of the vehicles B1, B2, and B3 perform irradiation tilted in a direction where the vehicles B1, B2, and B3 leave the vehicle platoon GA.

In Stage ST53, the controllers 3 of the light-irradiation control apparatuses 50 installed in the individual vehicles B1 to B3 control the respective irradiation controllers 1 in such a manner that the irradiation mode in the irradiation devices 4 changes from the transition mode L2 to a transition mode L3. An example of the transition mode L3 herein is a mode of road irradiation, with light having a color different from that of the light casted in the transition mode L2 flashing on and off.

In Stage ST54, after the vehicles B1 to B3 have completed separation from the vehicle platoon GA, the controllers 3 of the light-irradiation control apparatuses 50 installed in the individual vehicles B1 to B3 that form the new vehicle platoon GB, control the respective irradiation controllers 1 in such a manner that the irradiation devices 4 cast light in a steady-state mode L4. An example of the transition mode L4 is a mode of road irradiation with the same color of light as that in the steady-state mode L3.

As shown in Stage ST53, the separation of the vehicles B1, B2 and B3 produces inter-vehicle distances between the vehicles A1 to A3, which belong to the vehicle platoon GA. As shown in Stage ST54, the autonomous-driving controllers 5 installed in the vehicles A1 to A3 accordingly control the respective travel drive systems 8 to narrow these inter-vehicle distances between the vehicles A1 to A3. It is noted that in Stages ST52 to ST54, the vehicles A1 to A3 in the vehicle platoon GA continue irradiation in the steady-state mode L1, as is the case with Stage ST51.

Effects

The light-irradiation control apparatus 50 in the fifth embodiment is configured such that the controller 3 controls the irradiation controller 1 in such a manner that the irradiation device 4 performs irradiation tilted in a direction where the vehicles B1, B2, and B3 leave the vehicle platoon GA. Such irradiation in the irradiation device 4, which is tilted in a direction where the vehicle B1 merges with the vehicle platoon GA, more effectively enables the driver of a vehicle traveling around the vehicle platoon GA, to become aware that the vehicles B1, B2, and B3 are leaving the vehicle platoon GA. The vehicle platoon GA consequently less bears burdens (e.g., avoidance control) resulting from incautious movements of the vehicle traveling around the platoon. This reduces travel control processes in the vehicle platoon GA.

The light-irradiation control apparatus 50 in the fifth embodiment is configured such that the controller 3 controls the irradiation controller 1 in such a manner that the irradiation device 4 of the vehicle B1 belonging to a first vehicle platoon (i.e., vehicle platoon GA) casts light in a first steady-state mode (i.e., steady-state mode L1) that is common in the first vehicle platoon. The light-irradiation control apparatus 50 is also configured such that in a process where the vehicles B1, B2, and B3 belonging to the first vehicle platoon leave the first vehicle platoon, the controller 3 controls the irradiation controller 1 in such a manner that the irradiation device 4 of the leaving vehicle B1 casts light in the transition mode L2 (or transition mode L3) that is different from the first steady-state mode. The light-irradiation control apparatus 50 is also configured such that after the vehicles B1, B2 and B3 that have left the first vehicle platoon together form a second vehicle platoon (i.e., vehicle platoon GB), the controller 3 controls the irradiation controller 1 in such a manner that the irradiation device 4 of the vehicle B1 belonging to the second vehicle platoon casts light in a second steady-state mode (i.e., steady-state mode L4) that is common in the second vehicle platoon.

Such a configuration enables the driver of a vehicle traveling around the vehicle platoon GA, to visually become aware that the vehicles B1, B2, and B3 are leaving the vehicle platoon GA together. In addition, this configuration enables the driver of the vehicle traveling around the vehicle platoon GA, to visually become aware that the vehicles B1, B2, and B3 that have left, are forming the vehicle platoon GB. The driver of the vehicle traveling around the vehicle platoons GA and GB can consequently expect the movements of the vehicle platoons GA and GB easily. The vehicle platoons GA and GB thus less bear burdens (e.g., avoidance control) resulting from incautious movements of the vehicle traveling around the platoons. This reduces travel control processes in the vehicle platoons GA and GB.

Sixth Embodiment

The configuration of a light-irradiation control apparatus 60 in a sixth embodiment, which is the same as that in the light-irradiation control apparatus 10 (c.f., FIG. 1) in the first embodiment, will not be elaborated upon. The light-irradiation control apparatus 60 in the sixth embodiment includes components identical to those included in the light-irradiation control apparatus 10. These identical components are denoted by the same reference signs, and common descriptions will not be elaborated upon.

Figure 17:
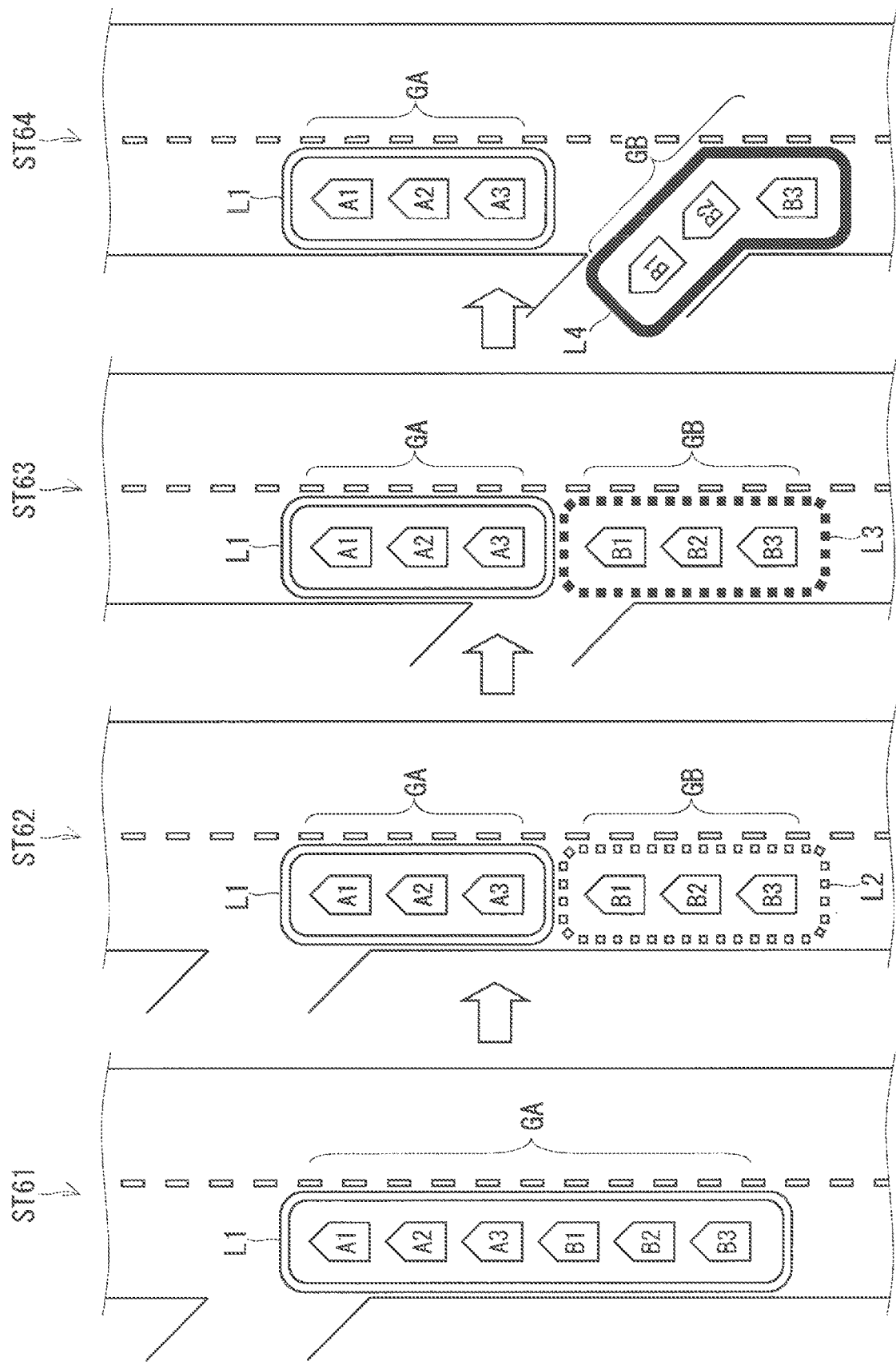
FIG. 17 is a schematic diagram illustrating the operation of a light-irradiation control apparatus according to a sixth embodiment.

FIG. 17 is a schematic diagram illustrating the operation of the light-irradiation control apparatus 60. Stages ST61 to ST64 in FIG. 17 show that vehicles B1 to B3 together leave a vehicle platoon GA consisting of vehicles A1 to A3 and B1 to B3, to form a new vehicle platoon GB, and that the vehicle platoon GB changes direction.

FIG. 17 shows a road branched from a main line. An example of this branch road is a branch in an expressway. Stages ST61 to ST63 in FIG. 17, which are similar to ST41 to ST43 in FIG. 13, will not be elaborated upon. In Stage ST64 in FIG. 17, the vehicle platoon GB changes direction to the branch road. It is noted that although Stage ST64 illustrates an irradiation mode that is different between the vehicle platoons GA and GB, the irradiation mode in the vehicle platoon GB may change from a steady-state mode L4 to a steady-state mode L1 after the vehicle platoon GB enters the branch road.

Seventh Embodiment

The configuration of a light-irradiation control apparatus 70 in a seventh embodiment, which is the same as that in the light-irradiation control apparatus 10 (c.f., FIG. 1) in the first embodiment, will not be elaborated upon. The light-irradiation control apparatus 70 in the seventh embodiment includes components identical to those included in the light-irradiation control apparatus 10. These identical components are denoted by the same reference signs, and common descriptions will not be elaborated upon.

Figure 18:
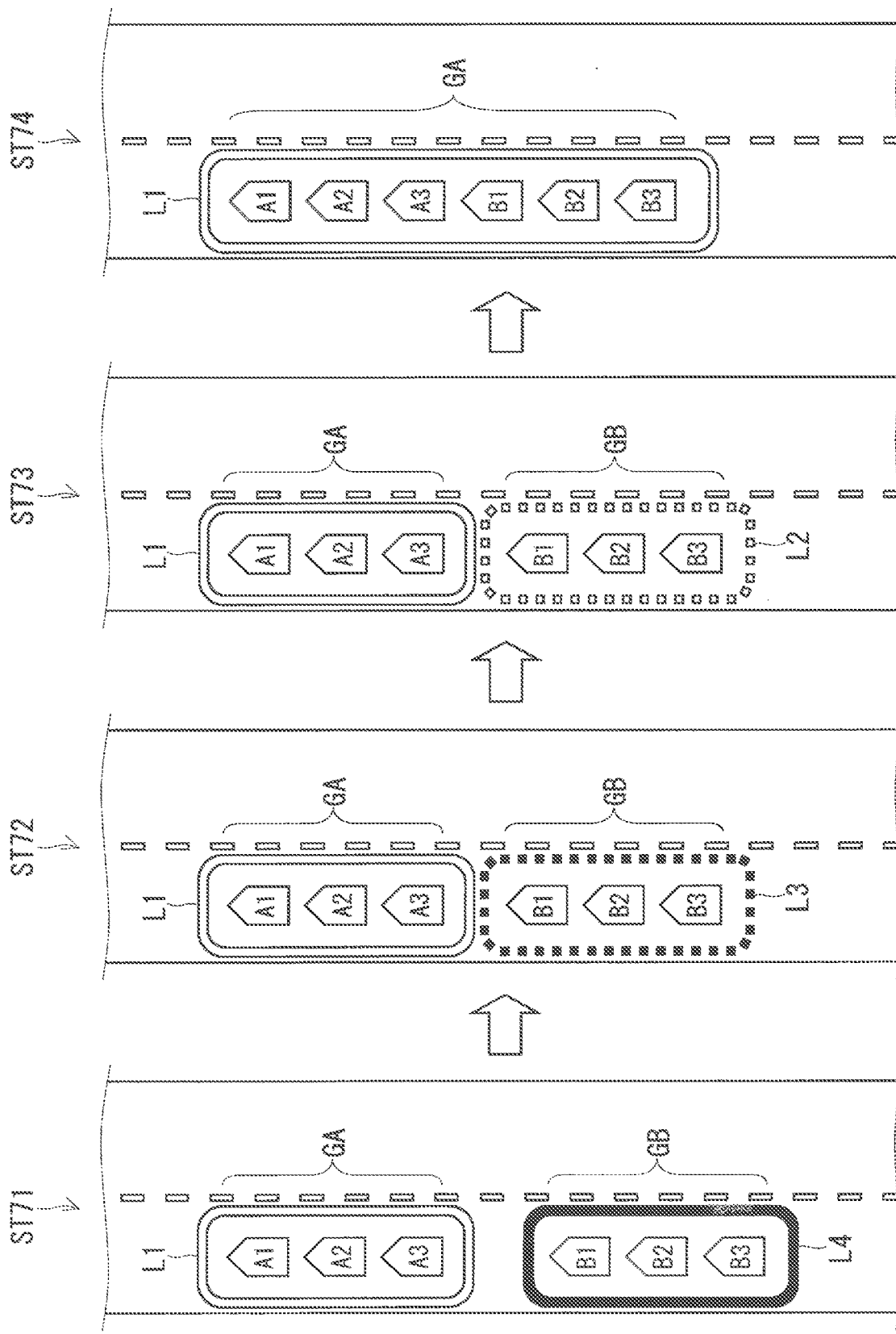
FIG. 18 is a schematic diagram illustrating the operation of a light-irradiation control apparatus according to a seventh embodiment.

FIG. 18 is a schematic diagram illustrating the operation of the light-irradiation control apparatus 70. Stages ST71 to ST74 in FIG. 18 show that a vehicle platoon GB consisting of vehicles B1 to B3 merges with a vehicle platoon GA consisting of vehicles A1 to A3.

In Stage ST71, the controllers 3 of the light-irradiation control apparatuses 70 installed in the individual vehicles A1 to A3, belonging to the vehicle platoon GA, are controlling the respective irradiation controllers 1 in such a manner that the irradiation devices 4 cast light in a steady-state mode L1 that is common in the vehicle platoon GA. In addition, the controllers 3 of the light-irradiation control apparatuses 70 installed in the individual vehicles B1 to B3, belonging to the vehicle platoon GB, control the respective irradiation controllers 1 in such a manner that the irradiation devices 4 cast light in a steady-state mode L4 that is common in the vehicle platoon GB.

In Stage ST72, after the vehicle platoon GB starts merging, the controllers 3 of the light-irradiation control apparatuses 70 installed in the individual vehicles B1 to B3 control the respective irradiation controllers 1 in such a manner that the irradiation devices 4 cast light in a transition mode L3. The transition mode L3 herein is a mode that is different from the steady-state mode L4. An example of the transition mode L3 is a mode in which the color of light and the shape of the outline of casted light same as those in the steady-state mode L4, and in which light flashes on and off.

In Stage ST73, the controllers 3 of the light-irradiation control apparatuses 70 installed in the individual vehicles B1 to B3 control the respective irradiation controllers 1 in such a manner that the irradiation mode in the irradiation devices 4 changes from the transition mode L3 to a transition mode L2. An example of the transition mode L2 herein is a mode of road irradiation, with light having a color different from that of the light casted in the steady-state mode L3 flashing on and off.

In Stage ST74, after the vehicle platoon GB has completed mergence with the vehicle platoon GA, the controllers 3 of the light-irradiation control apparatuses 70 installed in the individual vehicles B1 to B3 control the respective irradiation controllers 1 in such a manner that the irradiation devices 4 cast light in the steady-state mode L1. An example of the steady-state mode L1 herein is a mode in which the color of light and the shape of the outline of casted light are the same as those in the transition mode L2, and in which light does not flash on and off. It is noted that in Stages ST72 to ST74, the vehicles A1 to A3 in the vehicle platoon GA continue irradiation in the steady-state mode L1, as is the case with Stage ST41.

In the seventh embodiment, how the vehicle platoon GB operates before merging with the vehicle platoon GA is similar to that described in the third embodiment with reference to the flowchart shown in FIG. 10. The seventh embodiment is different from the third embodiment in that the vehicle platoon GB merges with the vehicle platoon GA in the seventh embodiment, whereas the vehicle B1 alone merges with the vehicle platoon GA in the third embodiment. As representative of the vehicle platoon GB, the vehicle B1 in the seventh embodiment attempts to communicate with the vehicle A1 representative of the vehicle platoon GA. In Step SB304 in FIG. 10, the controller 3 of the vehicle B1 in the seventh embodiment, representative of the vehicle platoon GB, sends an irradiation mode in which the vehicles B1 to B3 in the vehicle platoon GB are capable of irradiation in common, to the vehicle A1, representative of the vehicle platoon GA.

In the seventh embodiment, how the vehicle A1, representative of the vehicle platoon GA, permits platooning is similar to that described in the third embodiment with reference to the flowchart show in FIG. 11. In Step SA303 in FIG. 11, the controller 3 of the vehicle A1 in the seventh embodiment determines whether to permit the vehicle platoon GB to merge with the vehicle platoon GA. In the seventh embodiment, since the vehicle platoon GB merges with the vehicle platoon GA from behind, the vehicle platoon GA performs no control, such as widening of an inter-vehicle distance. In the seventh embodiment, how the irradiation mode in the vehicle platoon GA synchronizes with the irradiation mode in the vehicle platoon GB is similar to that described in the third embodiment with reference to the flowchart shown in FIG. 12.

Effects

The light-irradiation control apparatus 70 in the seventh embodiment is configured such that before a third vehicle platoon (i.e., vehicle platoon GB) to which the vehicle B1 belongs, starts merging with a fourth vehicle platoon (i.e., vehicle platoon GA), the controller 3 controls the irradiation controller 1 in such a manner that the irradiation device 4 of the vehicle B1 belonging to the third vehicle platoon casts light in a third steady-state mode (i.e., steady-state mode L4) that is common in the third vehicle platoon. The light-irradiation control apparatus 70 is also configured such that in a process where the third vehicle platoon, to which the vehicle B1 belongs, merges with the fourth vehicle platoon, the controller 3 controls the irradiation controller 1 in such a manner that the irradiation device 4 of the vehicle B1, belonging to the third vehicle platoon GB, casts light in the transition mode L3 (or transition mode L2) that is different from the third steady-state mode. The light-irradiation control apparatus 70 is also configured such that after the third vehicle platoon, to which the vehicle B1 belongs, has completed mergence with the fourth vehicle platoon, the controller 3 controls the irradiation controller 1 in such a manner that the irradiation device 4 of the vehicle B1, belonging to the third vehicle platoon, casts light in a fourth steady-state mode (i.e., steady-state mode L1) that is common in the fourth vehicle platoon, Such a configuration enables the driver of a vehicle traveling around the vehicle platoons GA and GB, to visually become aware that the vehicle platoon GB is merging with the vehicle platoon GA. The driver of the vehicle traveling around the vehicle platoons GA and GB can consequently expect the movements of the vehicle platoons GA and GB easily. The vehicle platoons GA and GB thus less bear burdens (e.g., avoidance control) resulting from incautious movements of the vehicle traveling around the platoons. This reduces travel control processes in the vehicle platoons GA and GB.

The light-irradiation control apparatus 70 in the seventh embodiment is also configured such that the transition mode L3 (or transition mode L2) contains an element that is in common with the third steady-state mode (i.e., steady-state mode L4), and contains an element that is in common with the fourth steady-state mode (i.e., steady-state mode L1). In the seventh embodiment, the mode changes to the steady-state mode L4, followed by the transition mode L3 (or transition mode L2), followed by the steady-state mode L1. Defining the shape of the outline of casted light as a common element in these modes enables the irradiation mode to smoothly change while inheriting part of the element of the preceding irradiation mode. This more effectively enables the driver of the vehicle traveling around the vehicle platoons GA and GB, to visually become aware of changes in the vehicle configuration of the vehicle platoons GA and GB.

Eighth Embodiment

The configuration of a light-irradiation control apparatus 80 in an eighth embodiment, which is the same as that in the light-irradiation control apparatus 10 (c.f., FIG. 1) in the first embodiment, will not be elaborated upon. The light-irradiation control apparatus 80 in the eighth embodiment includes components identical to those included in the light-irradiation control apparatus 10. These identical components are denoted by the same reference signs, and common descriptions will not be elaborated upon.

Figure 19:
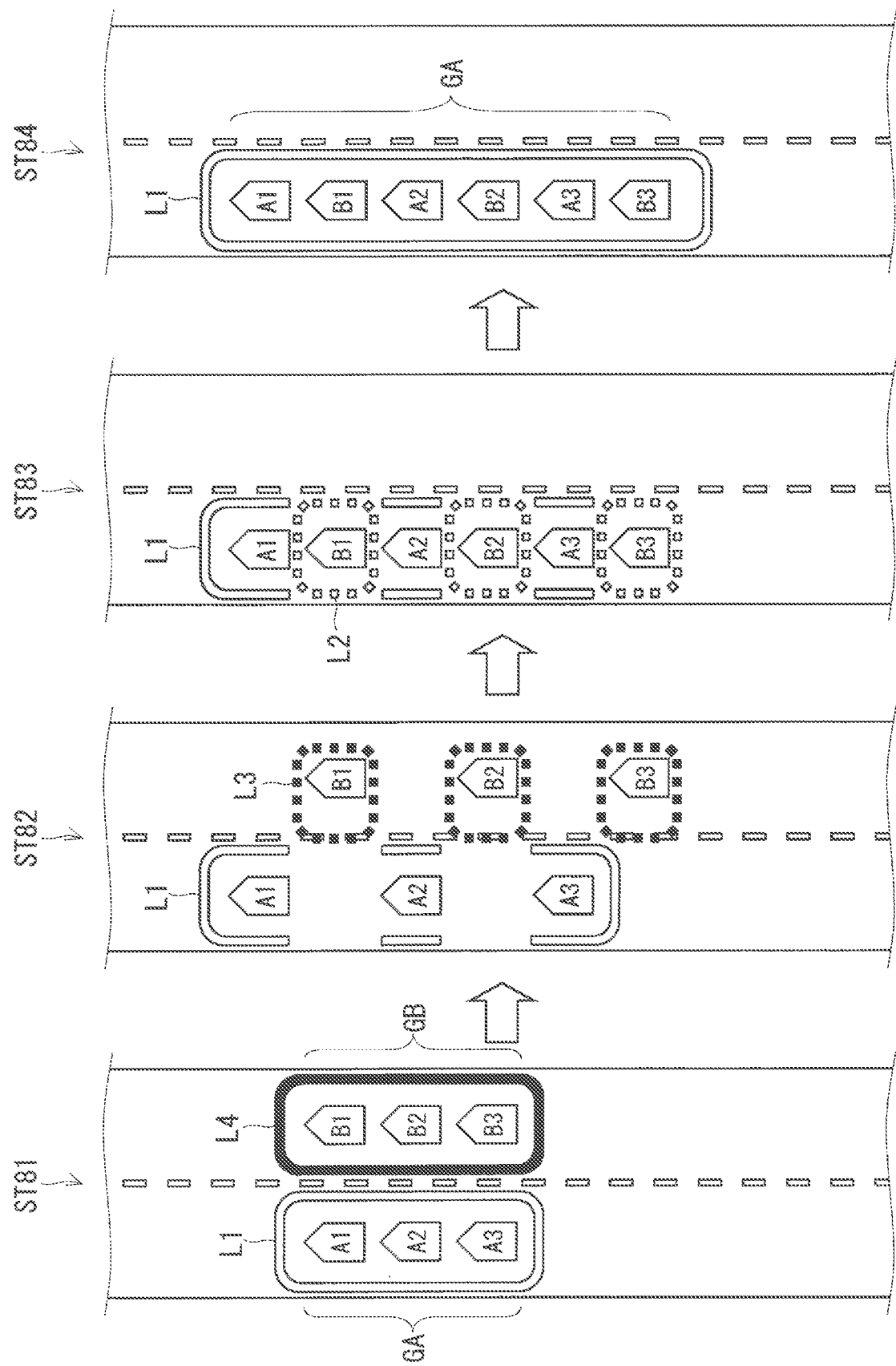
FIG. 19 is a schematic diagram illustrating the operation of a light-irradiation control apparatus according to an eighth embodiment.

FIG. 19 is a schematic diagram illustrating the operation of the light-irradiation control apparatus 80. Stages ST81 to ST84 in FIG. 19 show that a vehicle platoon GB consisting of vehicles B1 to B3 merges with a vehicle platoon GA consisting of vehicles A1 to A3.

In Stage ST81, the controllers 3 of the light-irradiation control apparatuses 80 installed in the individual vehicles A1 to A3, belonging to the vehicle platoon GA, are controlling the respective irradiation controllers 1 in such a manner that the irradiation devices 4 cast light in a steady-state mode L1 that is common in the vehicle platoon. In addition, the controllers 3 of the light-irradiation control apparatuses 80 installed in the individual vehicles B1 to B3, belonging to the vehicle platoon GB, are controlling the respective irradiation controllers 1 in such a manner that the irradiation devices 4 cast light in a steady-state mode L4 that is common in the vehicle platoon.

In Stage ST82, the autonomous-driving controllers 5 installed in the vehicles A1 to A3 control the respective travel drive systems 8 to widen the inter-vehicle distances between the vehicles A1 to A3. The vehicles B1 to B3 then start merging with the vehicle platoon GA while making a lane change to the left. The controllers 3 of the light-irradiation control apparatuses 80 installed in the individual vehicles B1 to B3 control the respective irradiation controllers 1 in such a manner that the irradiation devices 4 cast light in a transition mode L3. The transition mode L3 is a mode of road irradiation with the same color of light as that in the steady-state mode L4 flashing on and off. Here, the irradiation devices 4 of the vehicles B1, B2, and B3 perform irradiation tilted in a direction where the vehicles B1, B2, and B3 merge with the vehicle platoon GA.

In Stage ST83, the controllers 3 of the light-irradiation control apparatuses 80 installed in the individual vehicles B1 to B3 control the respective irradiation controllers 1 in such a manner that the irradiation mode in the irradiation devices 4 changes from the transition mode L3 to a transition mode L2. An example of the transition mode L2 herein is a mode of road irradiation, with light having a color different from that of the light casted in the transition mode L3 flashing on and off.

In Stage ST84, after the vehicles B1 to B3 have merged with the vehicle platoon GA, the controllers 3 of the light-irradiation control apparatuses 80 installed in the individual vehicles B1 to B3 control the respective irradiation controllers 1 in such a manner that the irradiation devices 4 cast light in the steady-state mode L1. An example of the transition mode L1 is a mode of road irradiation with the same color of light as that in the steady-state mode L2. It is noted that in Stages ST 82 to ST84, the vehicles A1 to A3 in the vehicle platoon GA continue irradiation in the steady-state mode L1, as is the case with Stage ST81.

Effects

The light-irradiation control apparatus 80 in the eighth embodiment is configured such that the controller 3 controls the irradiation controller 1 in such a manner that the irradiation device 4 performs irradiation tilted in a direction where the vehicles B1, B2, and B3 merge with the vehicle platoon GA. Such irradiation in the irradiation device 4, which is tilted in a direction where the vehicles B1, B2, and B3 merge with the vehicle platoon GA, more effectively enables the driver of a vehicle traveling around the vehicle platoons GA and GB, to become aware that the vehicles B1, B2, and B3 are merging with the vehicle platoon GA. The vehicle platoons GA and GB thus less bear burdens (e.g., avoidance control) resulting from incautious movements of the vehicle traveling around the platoons. This reduces travel control processes in the vehicle platoons GA and GB.

The light-irradiation control apparatus 80 in the eighth embodiment is configured such that before a third vehicle platoon (i.e., vehicle platoon GB) to which the vehicle B1 belongs, starts merging with a fourth vehicle platoon (i.e., vehicle platoon GA), the controller 3 controls the irradiation controller 1 in such a manner that the irradiation device 4 of the vehicle B1, belonging to the third vehicle platoon, casts tight in a third steady-state mode (i.e., steady-state mode L4) that is common in the third vehicle platoon. The light-irradiation control apparatus 80 is also configured such that in a process where the third vehicle platoon, to which the vehicle B1 belongs, merges with the fourth vehicle platoon (i.e., vehicle platoon GA), the controller 3 controls the irradiation controller 1 in such a manner that the irradiation device 4 of the vehicle B1, belonging to the third vehicle platoon GB, casts light in the transition mode L3 (or transition mode L2) that is different from the third steady-state mode. The light-irradiation control apparatus 80 is also configured such that after the third vehicle platoon, to which the vehicle B1 belongs, has completed mergence with the fourth vehicle platoon, the controller 3 controls the irradiation controller 1 in such a manner that the irradiation device 4 of the vehicle B1, belonging to the third vehicle platoon, casts light in a fourth steady-state mode (i.e., steady-state mode L1) that is common in the fourth vehicle platoon.

Such a configuration enables the driver of a vehicle traveling around the vehicle platoons GA and GB, to visually become aware that the vehicle platoon GB is merging with the vehicle platoon GA. The driver of the vehicle traveling around the vehicle platoons GA and GB can consequently expect the movements of the vehicle platoons GA and GB easily. The vehicle platoons GA and GB thus less bear burdens (e.g., avoidance control) resulting from incautious movements of the vehicle traveling around the platoons This reduces travel control processes in the vehicle platoons GA and GB.

Ninth Embodiment

The configuration of a light-irradiation control apparatus 90 in a ninth embodiment, which is the same as that in the light-irradiation control apparatus 10 (c.f., FIG. 1) in the first embodiment, will not be elaborated upon. The light-irradiation control apparatus 90 in the ninth embodiment includes components identical to those included in the light-irradiation control apparatus 10. These identical components are denoted by the same reference signs, and common descriptions will not be elaborated upon.

Figure 20:
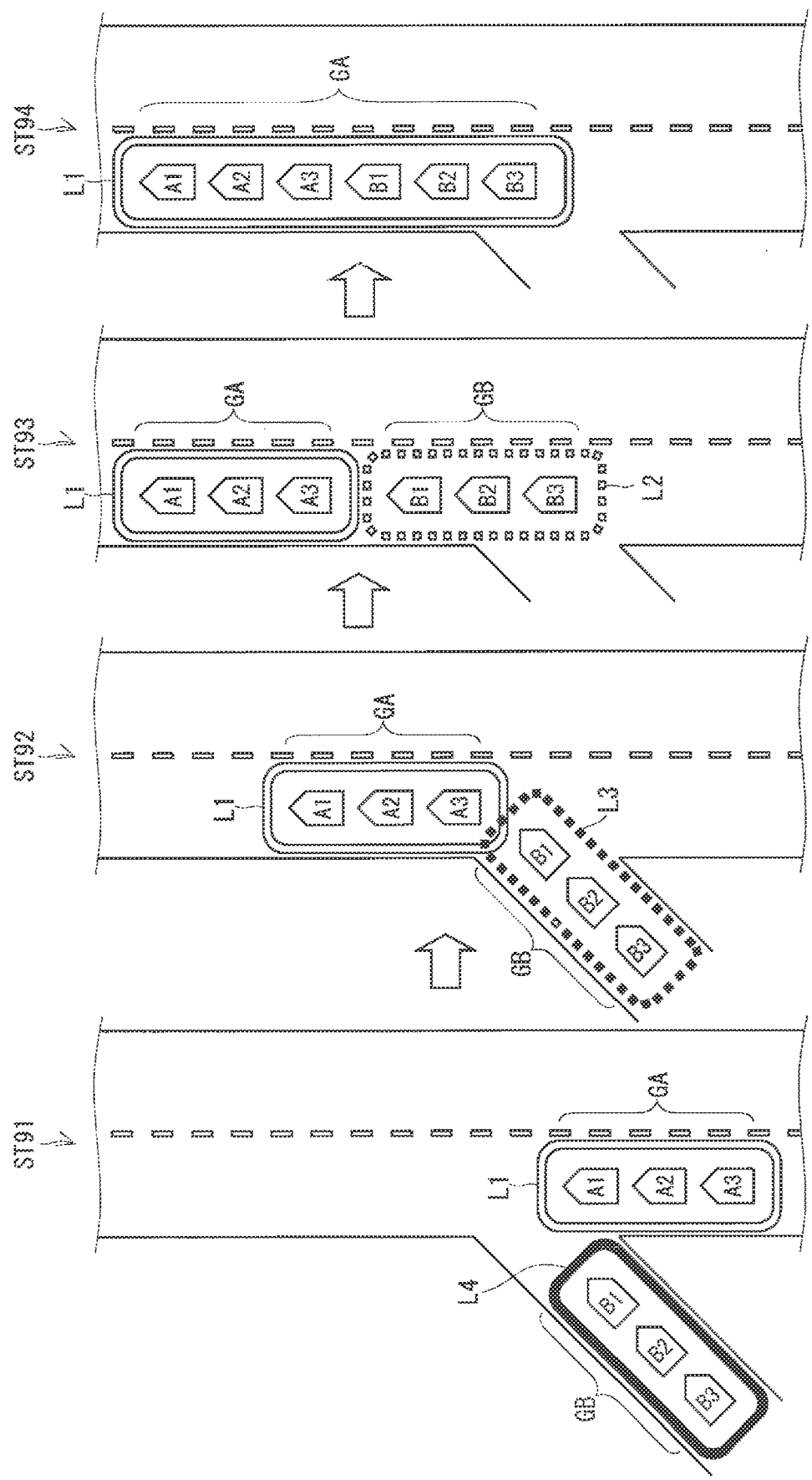
FIG. 20 is a schematic diagram illustrating the operation of a light-irradiation control apparatus according to a ninth embodiment.

FIG. 20 is a schematic diagram illustrating the operation of the light-irradiation control apparatus 90. Stages ST91 to ST94 in FIG. 20 show that a vehicle platoon GB consisting of vehicles B1 to B3 traveling along a merging road, merges with a vehicle platoon GA consisting of vehicles A1 to A3 traveling alone a main line. An example is the merging road is a mergence in an expressway.

In Stage ST91, the controllers 3 of the light-irradiation control apparatuses 90 installed in the individual vehicles A1 to A3, belonging to the vehicle platoon GA and traveling along the main line, are controlling the respective irradiation controllers 1 in such a manner that the irradiation devices 4 cast light in a steady-state mode L1 that is common in the vehicle platoon. In addition, the controllers 3 of the light-irradiation control apparatuses 90 installed in the individual vehicles B1 to B3, belonging to the vehicle platoon GB and traveling along the merging road, control the respective irradiation controllers 1 in such a manner that the irradiation devices 4 cast light in a steady-state mode L4 that is common in the vehicle platoon.

in Stage ST92, the vehicles B1 to B3 start merging with the vehicle platoon GA while entering the main line. Upon start of the mergence, the controllers 3 of the light-irradiation control apparatuses 90 installed in the individual vehicles B1 to B3 control the respective irradiation controllers 1 in such a manner that the irradiation devices 4 cast light in a transition mode L3. The transition mode L3 herein is a mode of road irradiation with the same color of light as that in the steady-state mode L4 flashing on and off.

In Stage ST93, the controllers 3 of the light-irradiation control apparatuses 90 installed in the individual vehicles B1 to B3 control the respective irradiation controllers 1 in such a manner that the irradiation mode in the irradiation devices 4 changes from the transition mode L3 to a transition mode L2. An example of the transition mode L2 herein is a mode of road irradiation, with light having a color different from that of the light casted in the transition mode L3 flashing on and off.

In Stage ST94, after the vehicles B1 to B3 have completed mergence with the vehicle platoon GA, the controllers 3 of the light-irradiation control apparatuses 90 installed in the individual vehicles B1 to B3 control the respective irradiation controllers 1 in such a manner that the irradiation devices 4 cast light in the steady-state mode L1. An example of the transition mode L1 wherein is a mode of road irradiation with the same color of light as that in the transition mode L2. It is noted that in Stages ST92 to ST94, the vehicles A1 to A3 in the vehicle platoon GA continue irradiation in the steady-state mode L1, as is the case with Stage ST91.

Tenth Embodiment

The configuration of a light-irradiation control apparatus 100 in a tenth embodiment, which is the same as that in the light-irradiation control apparatus 10 (c.f., FIG. 1) in the first embodiment, will not be elaborated upon. The light-irradiation control apparatus 100 in the tenth embodiment includes components identical to those included in the light-irradiation control apparatus 10. These identical components are denoted by the same reference signs, and common descriptions will not be elaborated upon.

Figure 21:
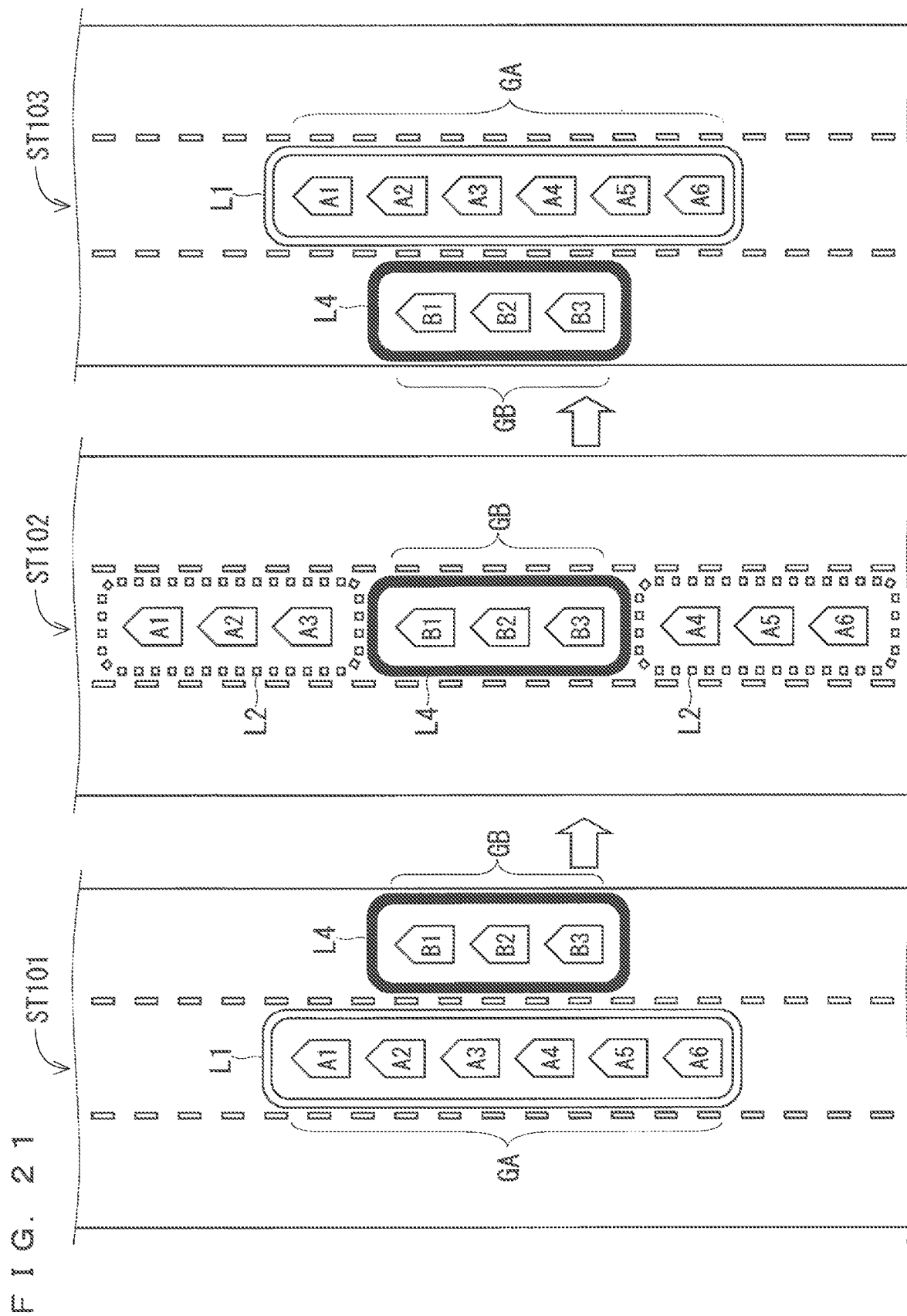
FIG. 21 is a schematic diagram illustrating the operation of a light-irradiation control apparatus according to a tenth embodiment.

FIG. 21 is a schematic diagram illustrating the operation of the light-irradiation control apparatus 10. Stages ST101 to ST103 in FIG. 21 show that a vehicle platoon GB consisting of vehicles B1 to B3 traveling along a lane on the right makes a lane change to a lane on the left by entering some midpoint of a vehicle platoon GA consisting of vehicles A1 to A6 traveling along the middle lane.

In Stage ST101, the controllers 3 of the light-irradiation control apparatuses 100 installed in the individual vehicles A1 to A6, belonging to the vehicle platoon GA and traveling along a main line, are controlling the respective irradiation controllers 1 in such a manner that the irradiation devices 4 cast light in a steady-state mode L1 that is common in the vehicle platoon. In addition, the controllers 3 of the light-irradiation control apparatuses 100 installed in the individual vehicles B1 to B3, belonging to the vehicle platoon GB and traveling along the right lane, control the respective irradiation controllers 1 in such a manner that the irradiation devices 4 cast light in a steady-state mode L4 that is common in the vehicle platoon.

In Stage ST102, the autonomous-driving controllers 5 installed in the vehicles A1 to A6 control the respective travel drive systems 8 to widen the inter-vehicle distance between the vehicles A3 and A4. At this time, the controllers 3 of the light-irradiation control apparatuses 100 installed in the individual vehicles A1 to A6, belonging to the vehicle platoon GA, control the respective irradiation controllers 1 in such a manner that the irradiation devices 4 cast light in a transition mode L2. The vehicle platoon GB then starts making a lane change to the main line by interposing between the vehicles A3 and A4.

In Stage ST103, the vehicle platoon GB makes a lane change from the middle lane to the left lane. The autonomous-driving controllers 5 installed in the vehicles A1 to A6 thereafter control the respective travel drive systems 8 to narrow the inter-vehicle distance between the vehicles A3 and A4. The controllers 3 of the light-irradiation control apparatuses 100 installed in the individual vehicles A1 to A6, belonging to the vehicle platoon GA, then control the respective irradiation controllers 1 in such a manner that the irradiation devices 4 cast light in the steady-state mode L1 that is common in the vehicle platoon GA.

In the tenth embodiment, the controller 3 may control the irradiation controller 1 to change the color of light that is casted from one of the vehicle platoons GA and GB. The controller 3 may perform such control under the following conditions: one is that the vehicle platoon GB is traveling in a range that is predetermined based on the vehicle platoon GA (e.g., a range of 100 meters from the head of the vehicle platoon GA, or a range of 100 meters from the tail of the vehicle platoon GA); and the other is that the color of light casted in the steady-state mode L1, common in the vehicle platoon GA, is the same as the color of the light casted in the steady-state mode L4, common in the vehicle platoon GB.

Effects

The light-irradiation control apparatus 100 in the tenth embodiment is configured such that when the other vehicles B1 to B3 temporarily enter some midpoint of the vehicle platoon GA, to which the vehicles A1 to A6 belong, the controller 3 controls the irradiation controller 1 in such a manner that the irradiation devices 4 of the vehicles A1 to A6, belonging to the vehicle platoon GA, cast light upon a road in the transition mode L2. Such a configuration enables the driver of a vehicle traveling around the vehicle platoon GA, to visually become aware that the vehicle platoon GA is changing because the vehicles B1 to B3 enter some midpoint of the vehicle platoon GA. The vehicle platoon GA consequently less bears burdens (e.g., avoidance control) resulting from incautious movements of the vehicle traveling around the platoon. This reduces travel control processes in the vehicle platoon GA.

The light-irradiation control apparatus 100 in the tenth embodiment is also configured such that when a sixth vehicle platoon (i.e., vehicle platoon GB) is traveling in a range that is predetermined based on a fifth vehicle platoon (i.e., vehicle platoon GA) to which the vehicles A1 to A6 belong, and when the color of light casted in a fifth steady-state mode (i.e., steady-state mode L1) that is common in the fifth vehicle platoon is the same as the color of light casted in a sixth steady-state mode (i.e., steady-state mode L4) that is common in the sixth vehicle platoon, the controller 3 controls the irradiation controller 1 in such a manner that the irradiation devices 4 of the vehicles A1 to A6, belonging to the fifth vehicle platoon, change the color of light casted in the fifth steady-state mode. The same color of light that is casted from the two vehicle platoons GA and GB close to each other can lead to a possible awareness that these two vehicle platoons GA and GB are coupled. Changing the color of light that is casted from the vehicle platoon GA, for instance, enables clear display that the two vehicle platoons GA and GB are separate from each other.

Eleventh Embodiment

The configuration of a light-irradiation control apparatus 110 in an eleventh embodiment, which is the same as that in the light-irradiation control apparatus 10 (c.f., FIG. 1) in the first embodiment, will not be elaborated upon. The light-irradiation control apparatus 110 in the eleventh embodiment includes components identical to those included in the light-irradiation control apparatus 10. These identical components are denoted by the same reference signs, and common descriptions will not be elaborated upon.

Figure 22:
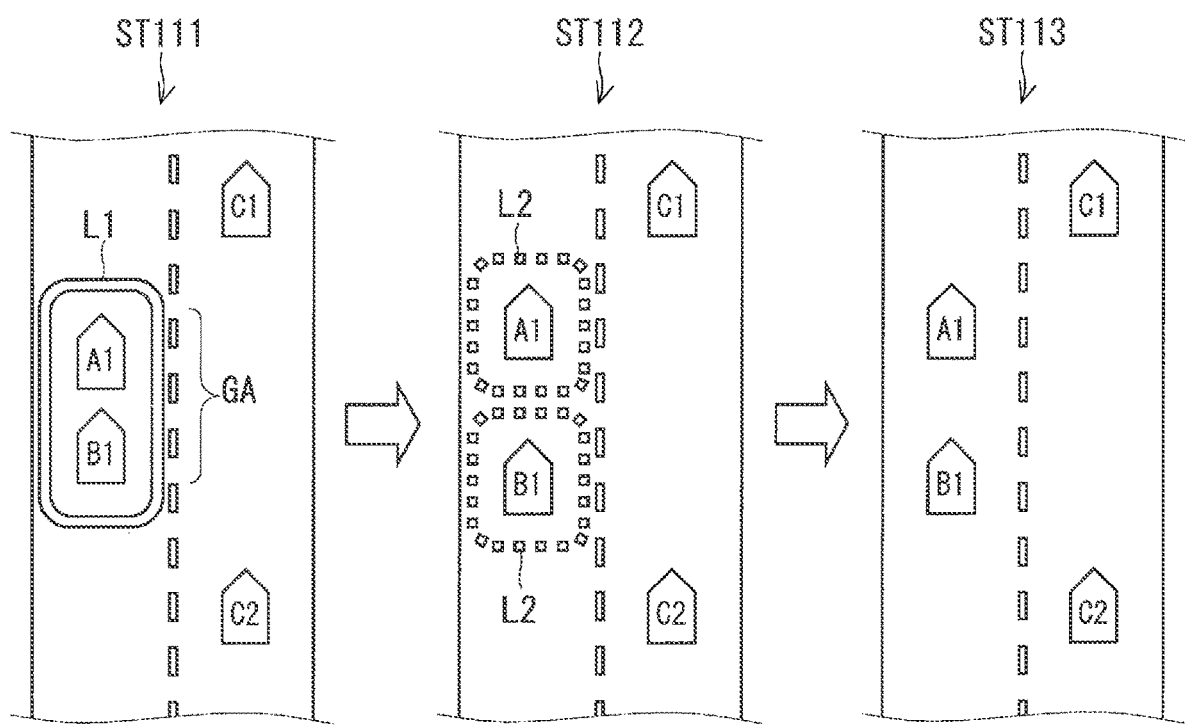
FIG. 22 is a schematic diagram illustrating the operation of a light-irradiation control apparatus according to an eleventh embodiment.

FIG. 22 is a schematic diagram illustrating the operation of the light-irradiation control apparatus 110. Stages ST111 to ST113 in FIG. 22 show that vehicles A1 and B1 constituting a vehicle platoon GA separate from each other to travel alone.

In Stage ST111, the controllers 3 of the light-irradiation control apparatuses 110 installed in the individual vehicles A1 and B1, constituting the vehicle platoon GA, are controlling the respective irradiation controllers 1 in such a manner that the irradiation devices 4 cast light in a steady-state mode L1 that is common in the vehicle platoon GA. In addition, vehicles C1 and C2 are traveling around the vehicle platoon GA.

In Stage ST112, after the vehicle B1 starts leaving the vehicle platoon GA, the controller 3 of the light-irradiation control apparatus 110 installed in the vehicle B1 controls the irradiation controller 1 in such a manner that the irradiation device 4 casts light in a transition mode L2. In addition, since the separation of the vehicle B1 from the vehicle platoon GA causes the vehicle A1 to travel separately as well, the controller 3 of the light-irradiation control apparatus 110 installed in the vehicle A1 controls the irradiation controller 1 in such a manner that the irradiation device 4 casts light in the transition mode L2. It is noted that the vehicles A1 and B1 do not have to perform irradiation in the same, transition mode L2. For instance, the vehicle A1 may perform irradiation in one transition mode, and the vehicle B1 may perform irradiation in another transition mode for casting the different color of light.

In Stage ST113, upon completion of the separation of the vehicle B1, the controller 3 of the light-irradiation control apparatus 110 installed in the vehicle B1 controls the irradiation controller 1 in such a manner that the irradiation device 4 stops irradiation. The controller 3 of the light-irradiation control apparatus 110 installed in the vehicle A1 concurrently controls the irradiation controller 1 in such a manner that the irradiation device 4 stops irradiation.

Effects

The light-irradiation control apparatus 110 in the eleventh embodiment is configured such that during no changes in the vehicle configuration of the vehicle platoon GA, to which the vehicles A1 and B1 belong, the controller 3 controls the irradiation controller 1 in such a manner that the irradiation devices 4 of the vehicles A1 and B1 cast light in the steady-state mode L1, which is common in the vehicle platoon GA. The light-irradiation control apparatus 110 is also configured such that in a process where the vehicles A1 and B1, belonging to the vehicle platoon GA, leave the vehicle platoon GA, the controller 3 controls the irradiation controller 1 in such a manner that the irradiation devices 4 of the leaving vehicles A1 and B1 cast light in the transition mode L2. Such a configuration enables the driver of a vehicle traveling around the vehicle platoon GA, to visually become aware that the vehicle platoon GA is being separated into the vehicles A1 and B1 each of which travels alone. The vehicle platoon GA consequently less bears burdens (e.g., avoidance control) resulting from incautious movements of the vehicle traveling around the platoon. This reduces travel control processes in the vehicle platoon GA.

Twelfth Embodiment

The configuration of a light-irradiation control apparatus 120 in a twelfth embodiment, which is the same as that in the light-irradiation control apparatus 10 (c.f., FIG. 1) in the first embodiment, will not be elaborated upon. The light-irradiation control apparatus 120 in the twelfth embodiment includes components identical to those included in the light-irradiation control apparatus 10. These identical components are denoted by the same reference signs, and common descriptions will not be elaborated upon.

Figure 23:
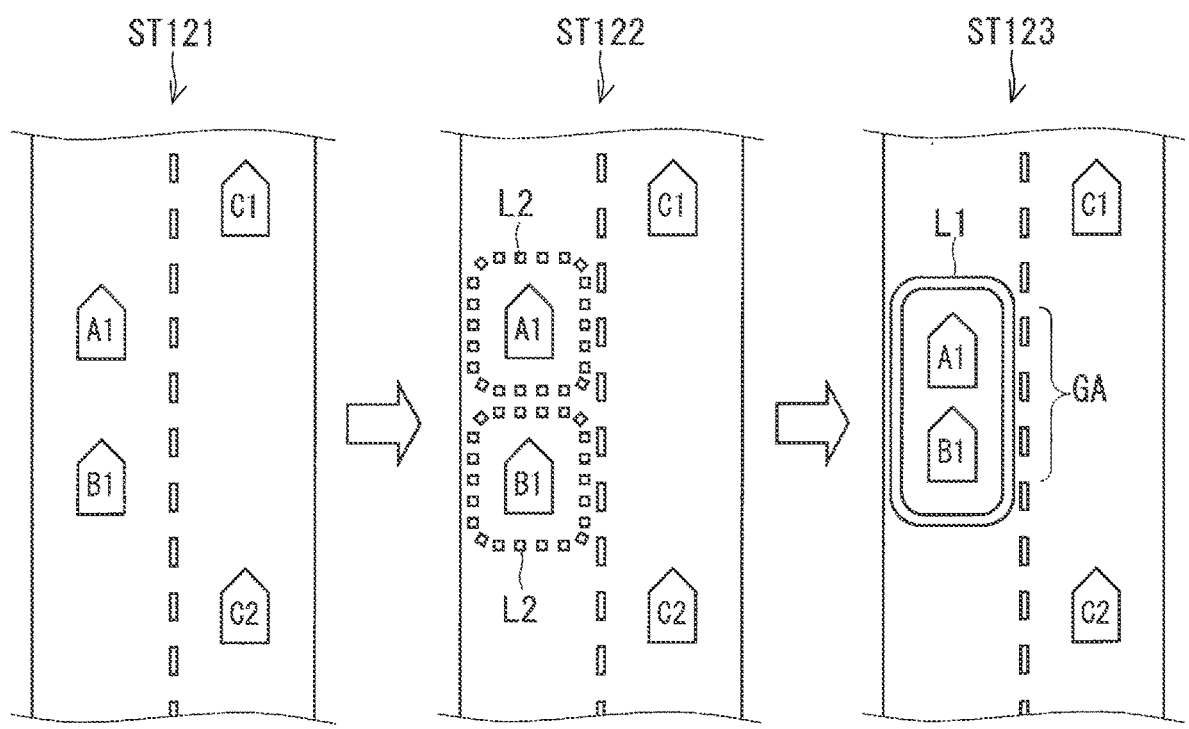
FIG. 23 is a schematic diagram illustrating the operation of a light-irradiation control apparatus according to a twelfth embodiment.

FIG. 23 is a schematic diagram illustrating the operation of the light-irradiation control apparatus 120. Stages ST121 to ST123 in FIG. 23 show that a vehicle B1 traveling separately merges with a vehicle A1 traveling separately, to form a vehicle platoon GA.

In Stage ST121, each of the vehicles A1 and B1 is traveling separately. At this time, the irradiation devices 4 in the individual vehicles A1 and B1 are stopping irradiation. In Stage ST112, after the vehicle B1 starts merging with the vehicle A1, the controller 3 of the light-irradiation control apparatus 120 installed in the vehicle B1 controls the irradiation controller 1 in such a manner that the irradiation device 4 casts light in a transition mode L2. In addition, the controller 3 of the light-irradiation control apparatus 120 installed in the individual vehicle A1 controls the irradiation controller 1 in such a manner that the irradiation device 4 casts light in the transition mode L2.

In Stage ST123, after the vehicle B1 has completed mergence with the vehicle A1, thus forming the vehicle platoon GA, the controllers 3 of the light-irradiation control apparatuses 120 installed in the individual vehicles A1 and B1 control the respective irradiation controllers 1 in such a manner that the irradiation devices 4 cast light in a steady-state mode L1 that is common in the vehicle platoon GA.

Effects

The light-irradiation control apparatus 120 in the twelfth embodiment is configured such that in a process where the vehicle B1 alone merges with another single vehicle, which is herein the vehicle A1, the controller 3 controls the irradiation controller 1 in such a manner that the irradiation devices 4 of the merging vehicles A1 and B1 cast light in the transition mode L2 that is different from the steady-state mode L1. The light-irradiation control apparatus 120 is also configured such that during no changes in the vehicle configuration of the vehicle platoon GA, to which the vehicles A1 and B1 belong, the controller 3 controls the irradiation controller 1 in such a manner that the irradiation devices 4 of the vehicles A1 and B1 cast light in the steady-state mode L1, which is common in the vehicle platoon GA. Such a configuration enables the drivers of vehicles C1 and C2 traveling around the vehicles A1 and B1, to visually become aware that the vehicles A1 and B1 are merging together to form the vehicle platoon GA. The vehicle platoon GA consequently less bears burdens (e.g., avoidance control) resulting from incautious movements of the vehicles C1 and C2 traveling around the vehicle platoon GA. This reduces travel control processes in the vehicle platoon GA.

Thirteenth Embodiment

Figure 24:
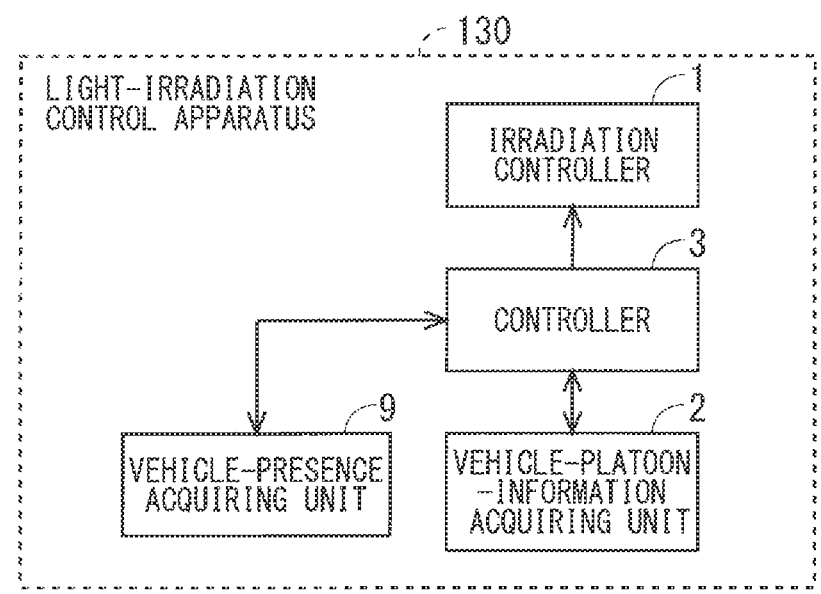
FIG. 24 is a block diagram of a light-irradiation control apparatus according to a thirteenth embodiment.

FIG. 24 is a block diagram of a light-irradiation control apparatus 130 in a thirteenth embodiment. The light-irradiation control apparatus 130 further includes a vehicle-presence acquiring unit 9 in addition to the components of the light-irradiation control apparatus 10 (c.f., FIG. 1). The other configuration of the light-irradiation control apparatus 130, which is the same as that in the light-irradiation control apparatus 10, will not be elaborated upon. The light-irradiation control apparatus 130 in the thirteenth embodiment includes components identical to those included in the light-irradiation control apparatus 10. These identical components are denoted by the same reference signs, and common descriptions will not be elaborated upon.

The vehicle-presence acquiring unit 9 acquires whether there are any vehicles traveling in a range that is predetermined based on a vehicle platoon. Examples of the predetermined range include a range of 100 meters from the head of the vehicle platoon and a range of 100 meters from the tail of the vehicle platoon. The vehicle-presence acquiring unit 9 acquires whether there are any vehicles in this range by the use of, for instance, the surrounding-state detector 6 shown in FIG. 2.

In the absence of a vehicle in the aforementioned range, the controller 3 of the light-irradiation control apparatus 130 controls the irradiation controller 1 in such a manner that the irradiation device 4 does not cast light in the vehicle platoon. In the presence of a vehicle in the aforementioned range, the controller 3 of the light-irradiation control apparatus 130 controls the irradiation controller 1 in such a manner that the irradiation device 4 casts light in the vehicle platoon. Here, the irradiation device 4 performs irradiation in the manner described in any of the first to twelfth embodiments.

Effects

The light-irradiation control apparatus 130 in the thirteenth embodiment further includes the vehicle-presence acquiring unit 9 that acquires whether there are any vehicles traveling in a range that is predetermined based on a vehicle platoon. The light-irradiation control apparatus 130 is configured such that when there are no vehicles traveling in the predetermined range, the controller 3 controls the irradiation controller 1 in such a manner that the irradiation device 4 of a vehicle belonging to the vehicle platoon does not cast light.

The light-irradiation control apparatus 130 in the thirteenth embodiment performs control to stop road irradiation, because the light-irradiation control apparatus 130 does not have to perform road irradiation when there are no vehicles traveling around the vehicle platoon. Such control reduces energy consumption in the vehicle platoon.

Fourteenth Embodiment

Figure 25:
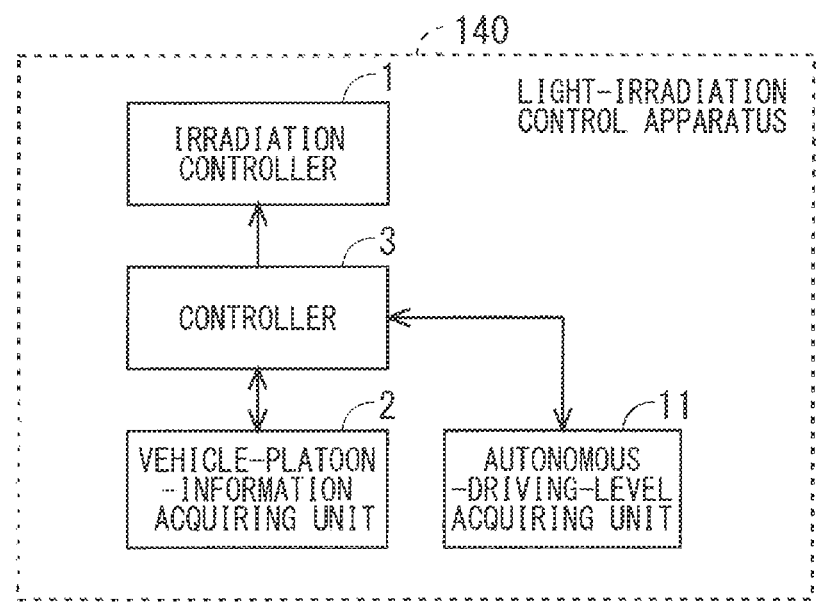
FIG. 25 is a block diagram of a light-irradiation control apparatus according to a fourteenth embodiment.

FIG. 25 is a block diagram of a light-irradiation control apparatus 140 in a fourteenth embodiment. The light-irradiation control apparatus 140 further includes an autonomous-driving-level acquiring unit 11 in addition to the components of the light-irradiation control apparatus 10 (c.f., FIG. 1). The other configuration of the light-irradiation control apparatus 140, which is the same as that in the light-irradiation control apparatus 10, will not be elaborated upon. The light-irradiation control apparatus 140 in the fourteenth embodiment includes components identical to those included in the light-irradiation control apparatus 10. These identical components are denoted by the same reference signs, and common descriptions will not be elaborated upon.

The autonomous-driving-level acquiring unit 11 acquires the autonomous-driving level of a vehicle traveling in a range that is predetermined based on a vehicle platoon. Examples of the predetermined range include a range of 100 meters from the head of the vehicle platoon and a range of 100 meters from the tail of the vehicle platoon. The autonomous-driving-level acquiring unit 11 acquires the autonomous-driving level of a vehicle in this range by the use of, for instance, the vehicle-to-vehicle communication device 7 shown in FIG. 2.

The controller 3 of the light-irradiation control apparatus 140 controls the irradiation controller 1 in such a manner that the irradiation device 4 of a vehicle belonging to the vehicle platoon casts light, at a higher degree of intensity or in a wider range along with decrease in the autonomous-driving level of the vehicle traveling in the aforementioned range.

For a vehicle traveling autonomously in the aforementioned range at not greater than Level 2, the controller 3 maximizes, in the vehicle platoon, the intensity of light that is casted from the irradiation device 4. For a vehicle traveling autonomously in the aforementioned range at Level 3, the controller 3 lowers, in the vehicle platoon, the intensity of light that is casted from the irradiation device 4. For a vehicle traveling autonomously in the aforementioned range at not smaller than Level 4, the controller 3 stops, in the vehicle platoon, the irradiation device 4 from irradiation. Instead of changing the intensity of casted light, the irradiation range of casted light may be changed. It is noted that the fourteenth embodiment addresses the irradiation mode described in any of the first to twelfth embodiments. That is, in the fourteenth embodiment, the intensity or irradiation range of casted light changes in the irradiation mode described in any of the first to twelfth embodiments.

Effects

The light-irradiation control apparatus 140 in the fourteenth embodiment further includes the autonomous-driving-level acquiring unit 11 that acquires the autonomous-driving level of a vehicle traveling in a range that is predetermined based on a vehicle platoon. The light-irradiation control apparatus 140 is configured such that the controller 3 controls the irradiation controller 1 in such a manner that the irradiation device 4 of a vehicle belonging to the vehicle platoon casts light, at a higher degree of intensity or in a wider range along with decrease in the autonomous-driving level of the vehicle traveling in the predetermined range.

A driver gets involved in driving more highly as the autonomous-driving level of the vehicle gets lower. Hence, the controller 3 performs control in such a manner that irradiation intensity or irradiation range in a vehicle platoon increases along with decrease in the autonomous-driving level of a vehicle traveling around the vehicle platoon. Such control more effectively enables the driver of the vehicle traveling around the vehicle platoon, to visually become aware of the state of the vehicle platoon.

Although the first to fourteenth embodiments have described that the controller 3 is installed in each vehicle, the controller 3 does not necessarily have to be installed in each vehicle. For instance, the controller 3 may be installed in a vehicle representative of a vehicle platoon, and the controller 3 of the representative vehicle may control the irradiation controllers 1 of the individual vehicles constituting the vehicle platoon. Further, each of the light-irradiation control apparatuses in the first to fourteenth embodiments is applicable not only to a vehicle-mountable device, but also to a light-irradiation control system that is established as a system in combination, as necessary, with a server and other things.

For a light-irradiation control system established in combination, as necessary, with a vehicle-mounted device and a server, as mentioned above, the components of the light-irradiation control apparatus may be distributed in individual devices constituting the system, or concentrated into any of the devices. A fifth embodiment below will describe a configuration where some of the components of the light-irradiation control apparatus are placed in a server.

Fifteenth Embodiment

Figure 26:
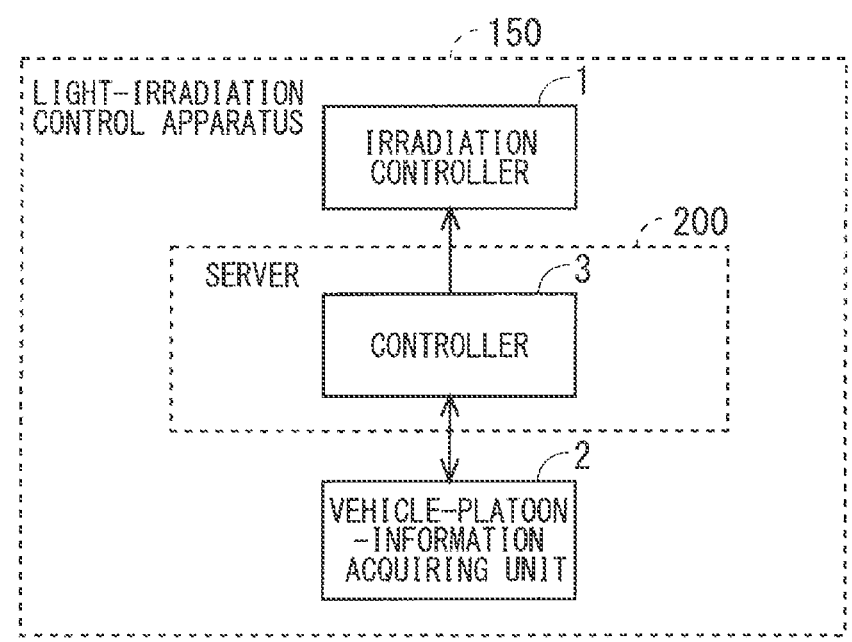
FIG. 26 is a block diagram of a light-irradiation control apparatus according to a fifteenth embodiment.

FIG. 26 is a block diagram of a light-irradiation control apparatus 150 in the fifteenth embodiment. As shown in FIG. 26, the light-irradiation control apparatus 150 includes the irradiation controller 1, the vehicle-platoon-information acquiring unit 2, and a server 200. The server 200 includes the controller 3. The light-irradiation control apparatus 150 in the fifteenth embodiment includes components identical to those included in the light-irradiation control apparatuses (c.f., FIG. 1) described in the first to twelfth embodiments. These identical components are denoted by the same reference signs, and common descriptions will not be elaborated upon.

The server 200 communicates with the irradiation controller 1 and vehicle-platoon-information acquiring unit 2 installed in a vehicle via a communication network, such as the Internet. It is noted that the irradiation controller 1 and vehicle-platoon-information acquiring unit 2 may be, in part or in whole, included in the server 200.

The configuration in the fifteenth embodiment, in which some of the components of the light-irradiation control apparatus 150 are placed in the server 200, achieves effects similar to those achieved by the light-irradiation control apparatuses described in the first to twelfth embodiments.

The light-irradiation control apparatus 150 in the fifteenth embodiment may further include the vehicle-presence acquiring unit 9 described in the thirteenth embodiment. The vehicle-presence acquiring unit 9 may be, in part or in whole, included in the server 200. The light-irradiation control apparatus 150 in the fifteenth embodiment may further include the autonomous-driving-level acquiring unit 11 described in the fourteenth embodiment. The autonomous-driving-level acquiring unit 11 may be, in part or in whole, included in the server 200.

It is noted that the individual embodiments of the present invention can be freely combined, or can be modified and omitted as appropriate, within the scope of the invention. While the invention has been shown and described in detail, the foregoing description is in all aspects illustrative and not restrictive. It is therefore understood that numerous modifications and variations can be devised without departing from the scope of the invention.

EXPLANATION OF REFERENCE SIGNS 1 irradiation controller, 2 vehicle-platoon-information acquiring unit, controller, 4 irradiation device, 5 autonomous-driving controller, 6 surrounding-state detector, 7 vehicle-to-vehicle communication device, 8 travel drive system, 9 vehicle-presence acquiring unit, 11 autonomous-driving-level acquiring unit 10, 20, 30, 40, 50, 60, 70, 80, 90, 100, 110, 120, 130, 140, 150 light-irradiation control apparatus, 200 server, A1, A2, A3, A4, A5, A6, B1, B2, B3, C1, C2 vehicle, L1, L4 steady-state mode, L2, L3 transition mode, GA, GB vehicle platoon

The invention claimed is:

1. A light-irradiation control apparatus that controls an irradiation device that is installed in a vehicle and casts light upon a road, the light-irradiation control apparatus comprising:
 a processor to execute a program; and
 a memory to store the program which, when executed by the processor, performs processes of, controlling an output of the irradiation device configured to cast light upon a road, acquiring information about a state of a vehicle platoon comprising a plurality of the vehicles traveling closely together, controlling the irradiation device of the vehicle in accordance with the acquired information, during no changes in a vehicle configuration of the vehicle platoon to which the vehicle belongs, performing control in such a manner that the irradiation device of the vehicle casts light in a steady-state mode that is common in the vehicle platoon, in a process where the vehicle alone or the vehicle platoon to which the vehicle belongs, merges with another of the vehicle alone or another of the vehicle platoon, performing irradiation control for mergence in such a manner that the irradiation device of the merging vehicle casts light in a transition mode that is different from the steady-state mode, and in a process where the vehicle alone belonging to the vehicle platoon or a plurality of the vehicles belonging to the vehicle platoon leaves the vehicle platoon, performing irradiation control for separation in such a manner that the irradiation device of the leaving vehicle casts light in the transition mode.

2. The light-irradiation control apparatus according to claim 1, wherein the program, when executed by the processor, performs a process of, when the vehicle belonging to the vehicle platoon separates alone from the vehicle platoon, upon completion of the separation of the vehicle, performing control in such a manner that the irradiation device of the vehicle that has separated, stops light irradiation.

3. The light-irradiation control apparatus according to claim 1, wherein the transition mode contains an element that is in common with the steady-state mode.

4. The light-irradiation control apparatus according to claim 3, wherein the steady-state mode comprises a mode in which light casted upon a road does not flash on and off, and the transition mode comprises a mode in which the same color of light as that in the steady-state mode flashes on and off.

5. The light-irradiation control apparatus according to claim 3, wherein in the transition mode, light that is casted upon a road has an outline whose shape is the same as that of an outline of light casted in the steady-state mode, and in the transition mode, light that is casted upon a road has a color different from a color of light that is casted in the steady-state mode.

6. The light-irradiation control apparatus according to claim 1, wherein the program, when executed by the processor, performs a process of performing control in such a manner that the irradiation device performs irradiation that is tilted in a direction where the vehicle leaves the vehicle platoon and is tilted in a direction where the vehicle merges with the vehicle platoon.

7. The light-irradiation control apparatus according to claim 1, wherein the irradiation control for mergence is performed in the process where the vehicle platoon to which the vehicle belongs, merges with another of the vehicle platoon, and the irradiation control for separation is performed in the process where the plurality of the vehicles belonging to the vehicle platoon leaves the vehicle platoon.

8. The light-irradiation control apparatus according to claim 7, wherein the program, when executed by the processor, performs processes of, performing control in such a manner that the irradiation device of the vehicle belonging to a first vehicle platoon casts light in a first steady-state mode that is common in the first vehicle platoon, in a process where a plurality of the vehicles belonging to the first vehicle platoon leaves the first vehicle platoon, performing control in such a manner that the irradiation device of the leaving vehicle casts light in the transition mode that is different from the first steady-state mode, and after the plurality of the vehicles that has left the first vehicle platoon together forms a second vehicle platoon, performing control in such a manner that the irradiation device of the vehicle belonging to the second vehicle platoon casts light in a second steady-state mode that is common in the second vehicle platoon.

9. The light-irradiation control apparatus according to claim 8, wherein the transition mode contains an element that is in common with the first steady-state mode, and an element that is in common with the second steady-state mode.

10. The light-irradiation control apparatus according to claim 7, wherein the program, when executed by the processor, performs processes of, before a third vehicle platoon to which the vehicle belongs, starts merging with a fourth vehicle platoon, performing control in such a manner that the irradiation device of the vehicle belonging to the third vehicle platoon casts light in a third steady-state mode that is common in the third vehicle platoon, in a process where the third vehicle platoon to which the vehicle belongs, merges with the fourth vehicle platoon, performing control in such a manner that the irradiation device of the vehicle belonging to the third vehicle platoon casts light in the transition mode that is different from the third steady-state mode, and after the third vehicle platoon to which the vehicle belongs, has completed mergence with the fourth vehicle platoon, performing control in such a manner that the irradiation device of the vehicle belonging to the third vehicle platoon casts light in a fourth steady-state mode that is common in the fourth vehicle platoon.

11. The light-irradiation control apparatus according to claim 10, wherein the transition mode contains an element that is in common with the third steady-state mode, and an element that is in common with the fourth steady-state mode.

12. The light-irradiation control apparatus according to claim 7, wherein the program, when executed by the processor, performs a process of, when a sixth vehicle platoon is traveling in a range that is predetermined based on a fifth vehicle platoon to which the vehicle belongs, and when a color of light casted in a fifth steady-state mode that is common in the fifth vehicle platoon is the same as a color of light casted in a sixth steady-state mode that is common in the sixth vehicle platoon, performing control in such a manner that the irradiation device of the vehicle belonging to the fifth vehicle platoon changes the color of the light casted in the fifth steady-state mode.

13. The light-irradiation control apparatus according to claim 1, wherein
the program, when executed by the processor, performs a process of,
when another vehicle temporarily enters some midpoint of the vehicle platoon to which the vehicle belongs, performing control in such a manner that the irradiation device of the vehicle belonging to the vehicle platoon casts light upon a road in a transition mode.

14. The light-irradiation control apparatus according to claim 1, wherein
the program, when executed by the processor, performs processes of,
acquiring whether there are any vehicles traveling in a range that is predetermined based on the vehicle platoon, and
when there are no vehicles traveling in the predetermined range, performing control in such a manner that the irradiation device of the vehicle belonging to the vehicle platoon does not cast light.

15. The light-irradiation control apparatus according to claim 1, wherein
the program, when executed by the processor, performs processes of,
acquiring an autonomous-driving level of a vehicle traveling in a range that is predetermined based on the vehicle platoon, and
performing control in such a manner that the irradiation device of the vehicle belonging to the vehicle platoon casts light, at a higher degree of intensity or in a wider range along with a decrease in the autonomous-driving level of the vehicle traveling in the predetermined range.

16. A method of light irradiation control for controlling an irradiation device that is installed in a vehicle and casts light upon a road, the method comprising:
acquiring information about a state of a vehicle platoon comprising a plurality of the vehicles traveling closely together;
controlling the irradiation device of the vehicle in accordance with the information about the vehicle platoon;
during no changes in a vehicle configuration of the vehicle platoon to which the vehicle belongs, performing control in such a manner that the irradiation device of the vehicle casts light in a steady-state mode that is common in the vehicle platoon;
in a process where the vehicle alone or the vehicle platoon to which the vehicle belongs, merges with another of the vehicle alone or another of the vehicle platoon, performing control in such a manner that the irradiation device of the merging vehicle casts light in a transition mode that is different from the steady-state mode; and
in a process where the vehicle alone belonging to the vehicle platoon or a plurality of the vehicles belonging to the vehicle platoon leaves the vehicle platoon, performing control in such a manner that the irradiation device of the leaving vehicle casts light in the transition mode.

* * * * *